US007630789B2

(12) United States Patent
Broadfield et al.

(10) Patent No.: US 7,630,789 B2
(45) **Date of Patent: *Dec. 8, 2009**

(54) SYSTEM AND APPARATUS FOR THE DISPENSING OF DRUGS

(75) Inventors: Laird Broadfield, San Diego, CA (US); Patricia M. Lee, Chicago, IL (US); Paul M. Seelinger, San Diego, CA (US); David T. Heffron, San Diego, CA (US); Albert W. Dibelka, Chula Vista, CA (US); John J. Rodenrys, La Jolla, CA (US); Robert J. Feeney, La Jolla, CA (US); Joseph M. Calabro, Del Mar, CA (US); William Conrad, Encinitas, CA (US)

(73) Assignee: CareFusion 303 Inc., San Diego, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 11/188,945

(22) Filed: Oct. 11, 2005

(65) Prior Publication Data

US 2006/0226167 A1 Oct. 12, 2006

Related U.S. Application Data

(63) Continuation of application No. 10/042,106, filed on Jan. 7, 2002, now Pat. No. 7,040,504, which is a continuation of application No. 09/087,388, filed on May 29, 1998, now Pat. No. 6,116,461, which is a continuation of application No. 09/589,552, filed on Jun. 7, 2000, now Pat. No. 6,338,007.

(51) Int. Cl.
*G06F 17/00* (2006.01)

(52) U.S. Cl. ....................... 700/231; 700/232; 700/236; 700/241; 221/98; 221/99

(58) Field of Classification Search .......... 700/231–244
See application file for complete search history.

(56) References Cited

U.S. PATENT DOCUMENTS 3,481,502 A 12/1969 Slayman (Continued)

FOREIGN PATENT DOCUMENTS

DE 19533732 A1 3/1997

(Continued)

OTHER PUBLICATIONS

European Examination Report Application No. 99930124.5 dated Jun. 9, 2005.

(Continued)

*Primary Examiner*—Gene Crawford
*Assistant Examiner*—Michael K Collins
(74) *Attorney, Agent, or Firm*—McDermott Will & Emery LLP

(57) ABSTRACT

A system and apparatus are described in which modular receptacles are filled and transported to automated dispensing machines for later retrieval and distribution. A system of the present invention includes the loading, refilling, and replacement of the modular receptacles at various stages in the process of the invention. The present invention results in a more efficient and easier to manage system for distribution of such items as medical supplies and drugs.

20 Claims, 21 Drawing Sheets

U.S. PATENT DOCUMENTS

| | | | | |
|---|---|---|---|---|
| 3,917,045 | A | | 11/1975 | Williams et al. |
| 4,473,884 | A | | 9/1984 | Behl |
| 4,693,371 | A | | 9/1987 | Malpass |
| 4,695,954 | A | | 9/1987 | Rose et al. |
| 4,718,705 | A | | 1/1988 | Case |
| 4,724,874 | A | | 2/1988 | Parikh et al. |
| 4,805,772 | A | | 2/1989 | Shaw et al. |
| 4,847,764 | A | | 7/1989 | Halvorson |
| 4,862,870 | A | | 9/1989 | Fox |
| 4,953,745 | A | | 9/1990 | Rowlett, Jr. |
| 4,991,759 | A | | 2/1991 | Scharf |
| 4,995,430 | A | | 2/1991 | Bonora et al. |
| 5,014,875 | A | | 5/1991 | McLaughlin et al. |
| 5,025,964 | A | | 6/1991 | Phirippidis |
| 5,098,141 | A | | 3/1992 | Bull |
| 5,123,691 | A | | 6/1992 | Ginn |
| 5,172,097 | A | | 12/1992 | Arnold |
| 5,172,575 | A | | 12/1992 | Fisher |
| 5,240,113 | A | | 8/1993 | Gibilisco |
| 5,245,908 | A | | 9/1993 | Sanderson |
| 5,253,574 | A | | 10/1993 | Sanderson |
| 5,263,397 | A | | 11/1993 | Sanderson |
| 5,273,175 | A | | 12/1993 | Apps |
| 5,292,029 | A | | 3/1994 | Pearson |
| 5,314,243 | A | | 5/1994 | McDonald et al. |
| 5,320,540 | A | | 6/1994 | Lwee |
| 5,378,174 | A | | 1/1995 | Brownlie et al. |
| 5,386,462 | A | | 1/1995 | Schlamp |
| 5,419,305 | A | | 5/1995 | Hanley |
| 5,431,299 | A | | 7/1995 | Brewer et al. |
| 5,445,294 | A | | 8/1995 | Gardner et al. |
| 5,489,039 | A | | 2/1996 | Brownlie et al. |
| 5,564,805 | A | | 10/1996 | Dickinson |
| 5,576,741 | A | | 11/1996 | Johnson et al. |
| 5,629,662 | A | | 5/1997 | Floyd et al. |
| 5,715,586 | A | | 2/1998 | Citron et al. |
| 5,715,658 | A | | 2/1998 | Citron et al. |
| 5,715,923 | A | | 2/1998 | Dekker et al. |
| 5,735,034 | A | | 4/1998 | Citron et al. |
| 5,740,845 | A | | 4/1998 | Bonora et al. |
| 5,745,366 | A | | 4/1998 | Higham et al. |
| 5,752,235 | A | | 5/1998 | Kehr et al. |
| 5,852,911 | A | | 12/1998 | Yuyama et al. |
| 5,883,806 | A | | 3/1999 | Meador et al. |
| 6,004,020 | A | | 12/1999 | Bartur |
| 6,011,999 | A | | 1/2000 | Holmes |
| 6,068,156 | A | * | 5/2000 | Liff et al. ........................ 221/7 |
| 6,116,461 | A | * | 9/2000 | Broadfield et al. ............ 221/98 |
| 6,338,007 | B1 | * | 1/2002 | Broadfield et al. .......... 700/231 |
| 6,385,505 | B1 | * | 5/2002 | Lipps ......................... 700/231 |
| 6,604,019 | B2 | | 8/2003 | Ahlin et al. |
| 6,658,322 | B1 | | 12/2003 | Frederick et al. |
| 6,733,095 | B1 | | 5/2004 | Rieb |
| 6,814,255 | B2 | * | 11/2004 | Liff et al. ...................... 221/13 |
| 7,040,504 | B2 | * | 5/2006 | Broadfield et al. ............ 221/98 |

FOREIGN PATENT DOCUMENTS

| | | | |
|---|---|---|---|
| EP | 0071931 | A2 | 2/1983 |
| EP | 0689824 | B1 | 1/1996 |
| GB | 9416212.3 | | 10/1994 |
| NL | 9400402 | | 7/1995 |
| WO | WO 98/26746 | | 6/1998 |

OTHER PUBLICATIONS

European Search Report Application No. 99930124.5 dated Feb. 11, 2005.

European Search Report EP 1701313 A3 published Sep. 27, 2006.

European Examination Report Application No. 06076039.4 dated Apr. 16, 2008.

European Examination Report Application No. 06076039.4 dated Sep. 26, 2007.

European Examination Report Application No. 06076039.4 dated Aug. 28, 2006.

International Preliminary Examination Report, International Application PCT/US99/11901, dated May 19, 2000.

International Search Report, International Application PCT/US99/11901, mailed Jun. 13, 2000.

* cited by examiner 112
102
30
100
114
110

102
126
120
124
122

30
92
100
94
96
98

Cubie Process Flow Charts

Cubie Process Flow Charts

Cubie Process Flow Charts

Cubie Process Flow Charts

Cubie Process Flow Charts

Cubie Process Flow Charts

SYSTEM AND APPARATUS FOR THE DISPENSING OF DRUGS

RELATED APPLICATIONS

This application is a continuation application of U.S. patent application Ser. No. 10/042,106, filed Jan. 7, 2002 now U.S. Pat. No. 7,040,504, and of U.S. patent application Ser. No. 09/087,388, filed May 29, 1998, now U.S. Pat. No. 6,116, 461, issued Sep. 12, 2000; and U.S. patent application Ser. No. 09/589,552, filed Jun. 7, 2000, to be issued Jan. 8, 2002, as U.S. Pat. No. 6,338,007. These parent applications are incorporated herein by reference in their entirety.

BACKGROUND AND SUMMARY OF THE INVENTION

The present invention relates generally to the dispensing of items, such as drugs, and more particularly, a system and apparatus for the dispensing of items such as drugs, including an apparatus for storing, transporting, receiving, refilling, and tracking drugs through their channels of distribution.

It is known in the art to dispense drugs at a healthcare location or other care facility through an automated dispensing machine, for example, such as the one described in U.S. Pat. No. 5,014,875. The entire contents of U.S. Pat. No. 5,014,875 are hereby incorporated by reference herein. As described in that patent, a pharmacist or pharmacist technician arranges for drugs to be moved to each automated dispensing machine and be manually placed into drawers, and more particularly, pockets within those drawers for later removal and administration by doctors and nursing staff. The patent referred to above describes the benefits of such an approach, as well as the drawbacks of previously known systems for accomplishing similar purposes.

The apparatus of the present invention comprises a unique receptacle having a bottom and a plurality of sides and an attached top that may be actuated to open to expose the contents of the receptacle. The receptacle further includes an information storage device, such as a memory chip, for storing information regarding the contents of the receptacle.

In a preferred embodiment, the receptacle includes an electronic actuated latch for the top opening that opens upon receipt of required information to be inputted by an operator. The latch affords a safety solution for the receptacle through the entire process of medication distribution, that an unauthorized person cannot gain access to the receptacle other than by vandalizing the receptacle.

The unique receptacle of the present invention may be adapted to reside in an automated dispensing machine along with a plurality of other like receptacles. The receptacles are preferably configured in such a way to allow for an efficient and optimum placement within the dispensing machine for access by an operator, such as a nurse or doctor or other authorized individual. In this embodiment, each receptacle preferably contains individual packages of particular drugs, drug kits, medical supplies, or combinations of these. Individual receptacles may have multiple types of drugs or medical supplies for one particular patient or a plurality of the same type of drug or medical supply for use with several patients. In this embodiment of the invention, the receptacles each contain associated hardware to support information about the contents of the receptacle in the automated dispensing machine. Likewise, the data entry device associated with the automated dispensing machine enables an operator to enter certain requested information, such as operator identification information or requested drug information or patient identification information, which will then be electronically transmitted to the appropriate receptacle within the automated dispensing machine which actuates the latch to open the top of the appropriate receptacle for access by the operator. All of the information for these transactions are maintained by the system, so that a record of the operator, patient, drug requested, receptacle accessed, etc. is available.

In another embodiment of the present invention, a system is described in which the receptacles are loaded with particular items at a batch facility then "programmed" with a memory chip containing information. Information about the items loaded into each receptacle may be stored in information storage devices that may be integral to each receptacle and/or information about the items loaded into each receptacle may be put in bar code form on a bar code label and placed on the receptacle. The receptacles with the items now contained within them are then closed and transported to a receiving station, such as a pharmacy at a healthcare facility. There, information regarding the contents of each receptacle may be obtained from the receptacle's information storage device. In another embodiment, information regarding the contents of each receptacle may be scanned with a hand-held scanner reading a bar code label that was placed on each receptacle at the batch facility. Data obtained from the information storage device and/or from scanning the bar code labels may be stored in a computer at the receiving station for inventory control purposes. The same computer at the receiving station may be in communication with automated dispensing machines, even though the automated dispensing machines may be at a remote location from the receiving station computer. As users/operators of the automated dispensing machine enter information to gain access to the contents of the receptacles within the automated dispensing machine, the operator-entered information may be delivered to the receiving station computer to maintain a real-time inventory of each receptacle in each automated dispensing machine. The receptacle's information storage device may also maintain real-time inventory of the receptacle's contents as users/operators gain access to the contents of the receptacle.

In another embodiment of the present invention, a manual refill cart is provided with a surface to receive receptacles. This refill device is used when filling receptacles with drugs from inventory (e.g., in the hospital pharmacy). The manual refill cart may have on board electronic connections for facilitating communication between each receptacle and a computer in association with the cart.

The manual refill cart may have a bar code scanner attached to it to scan the bar codes on the unit dose packages of drugs to be loaded into the receptacle. The information from the bar coded packages of drugs is transferred from the bar code scanner and into the computer of the refill cart and/or into the memory chip of the receptacle. This enables the memory chip to maintain the information about the items stored in the receptacle.

The present invention overcomes many of the disadvantages of known approaches to drug distribution. There is no manual operation needed for bagging or unbagging medications at the nurses station for later use with patients. The receptacle of the present invention may arrive at the nurses station ready for use with patients without further handling of the drugs until administration to the patient. The receptacle also allows for fewer human errors in drug handling. In known systems, a drawer of drugs may open exposing several pockets with different drug varieties. With the preferred embodiment of the present invention only one receptacle opens at a time exposing only the drugs in that receptacle. Loading of receptacles is safer too. Since typically only one type of drug would be placed in each receptacle there is less chance that a person loading that one type of drug will accidentally load a second variety in the same receptacle. Because the tops of the receptacles are preferably sealed closed until opened automatically upon receipt of an authorized signal at a delivery station, it greatly lessens the need for skilled staff to handle the receptacles. In other words, if the receptacle cannot be opened without proper receipt of signals from a delivery station, such as a dispensing machine, then there is less need to have sophisticated personnel for transport of the receptacles.

The present invention may also be an intelligent receptacle. In a preferred embodiment, information about the contents may be integral to the receptacle, such as by bar code or by electronic chip that is machine readable. This enables tracking of the contents, such as lot numbers and expiration dates of the contents, for example. When this information is ported to the dispensing machine and then to a central computer system, expiration dates of each drug in each receptacle may be monitored for replacement at the proper time.

A unique latch may also be employed with the receptacles. The latch may be comprised of bimetallic wire which contracts when it is heated by current. Upon contraction the wire pulls to one side and opens the latch allowing a spring to pop the lid open.

Several other features and advantages of the present invention will be readily apparent from the following detailed description of the invention, the attached drawings of the invention and the claims.

BRIEF DESCRIPTION OF THE DRAWINGS

FIG. 15A shows a detail plan view of a portion of the drawer tray shown in FIG. 15;

DETAILED DESCRIPTION OF PREFERRED EMBODIMENTS

Figure 1:
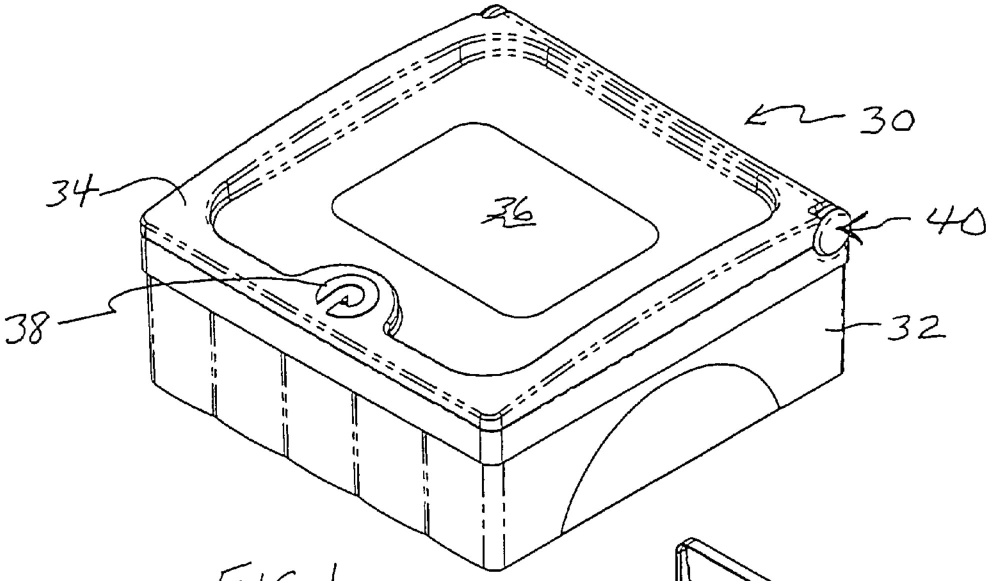
FIG. 1 shows a perspective view of a preferred embodiment of the receptacle of the present invention.
Figure 2:
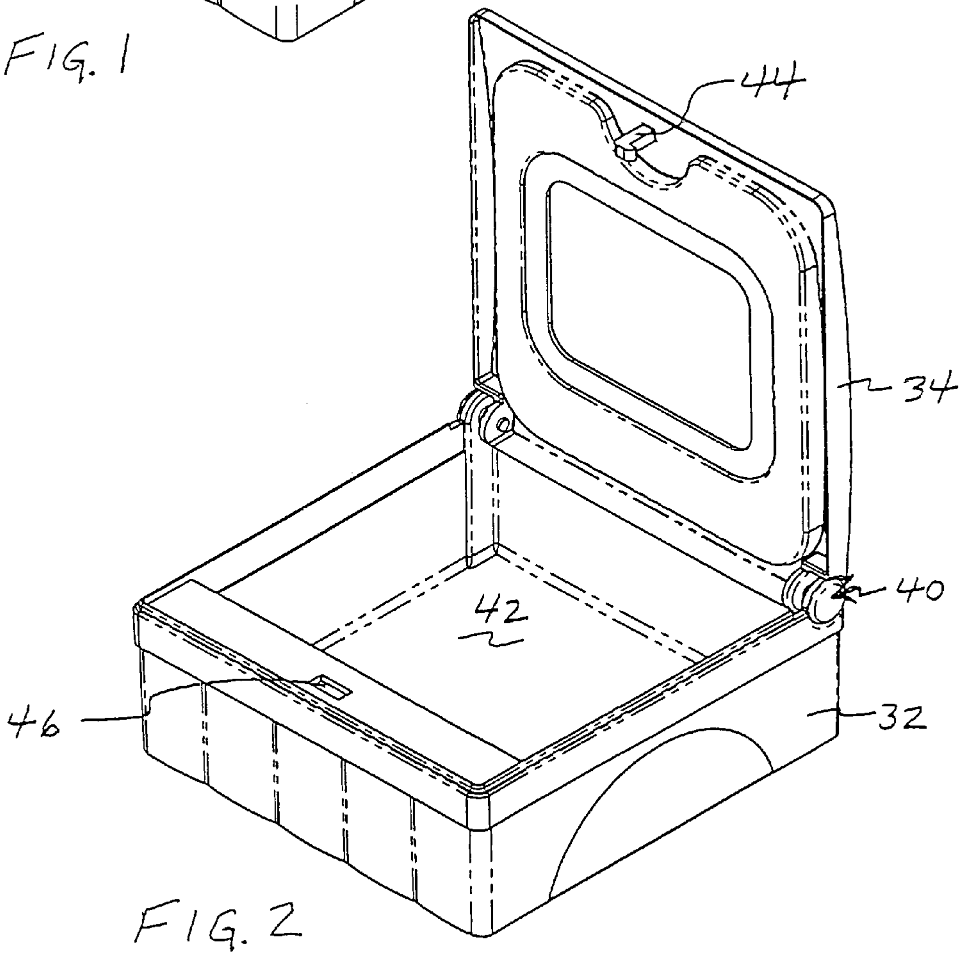
FIG. 2 shows a perspective view of the receptacle of FIG. 1, shown in an open top position.

Referring now to the Figures, there is shown in FIG. 1 a receptacle 30 of the present invention. The receptacle 30 has a plurality of sidewalls 32 that define a storage compartment 42 which is best shown in FIG. 2. In FIG. 2, a top 34 is opened and closed about a hinge 40. A latch assembly 38 is formed between the top 34 and one of the sidewalls 32 to keep the top in a closed position until an authorized operator gains access to the receptacle. The latch assembly 38 includes a latch member 44 and a latch receiving pocket 46.

The receptacle 30 may be used to contain various items, for example, medications. Each receptacle may house multiples of one type of drug or medical supply or it may house several varieties of drugs or medical supplies in the storage compartment 42. The receptacle of the present invention is adapted for use in a variety of systems. For example, it may be used at a patient's bedside table, on a medication cart, as a part of a drug administration kit in an operating room environment, or in many other scenarios both in and out of the medical industry. The invention has been described herein with reference to the medical industry but it is to be recognized that the invention has far reaching application in many industries.

The receptacle of the present invention may also be used as a removable return container for later disposing of items, such as used or discarded medicine administration items. The receptacle of the present invention may also be adapted for communication with one or more devices via one of several possible communication means. For example, the receptacle may communicate via a chip inside the receptacle that has been programmed with information, and the chip may be adapted for communication with another electronic device to download, or share the information. Another form of communication may be remote, such as via a RF proximity chip in the receptacle for RF communication with a RF station. Of course, the receptacle 30 may also be "dumb," without on-board intelligence, and information about its contents may be contained within a bar code, for example, placed on the receptacle. In such an application of the invention, a receiving area of an apparatus, for example on or in an automatic dispensing machine, may acquire the necessary information through scanning of the bar code on the receptacle to enable the dispensing machine to know sufficient information about the contents of the receptacle. The receiving area may be a drawer in an intelligent dispensing machine having either an on-board computer processor or a connection to one remote therefrom.

In another embodiment, the receptacle 30 may have limited on-board intelligence. For example, the information storage device or the bar code label of the receptacle 30 may only contain information about the receptacle, such as the receptacle number (e.g., #1234567). This pre-programmed information would typically be entered when the receptacle 30 is filled. In this embodiment, a regular label (not a bar code label) or marking on the receptacle itself with the receptacle number may be used and the operator/user may manually enter the receptacle number into the computer having the pre-programmed information about the contents of the particular receptacle.

The receptacle 30 of the present invention may be refilled and reused many times in a preferred embodiment hereof. In a unique system of the present invention, a refill station may be provided for refilling each receptacle. If the receptacle is "intelligent", it may be programmed with information at the refill station and the refill station may be so adapted to provide this communication to the receptacle. The refill station may be at a pharmacy or at a distribution center in the application of this invention to the medical industry.

The receptacle 30 may be made from injection molded plastic, or formed from metal and as such, may be durable and reusable multiple times. Alternatively, the receptacle 30 may be made from inexpensive, disposable materials for discarding after use.

Figures 3, 3A:
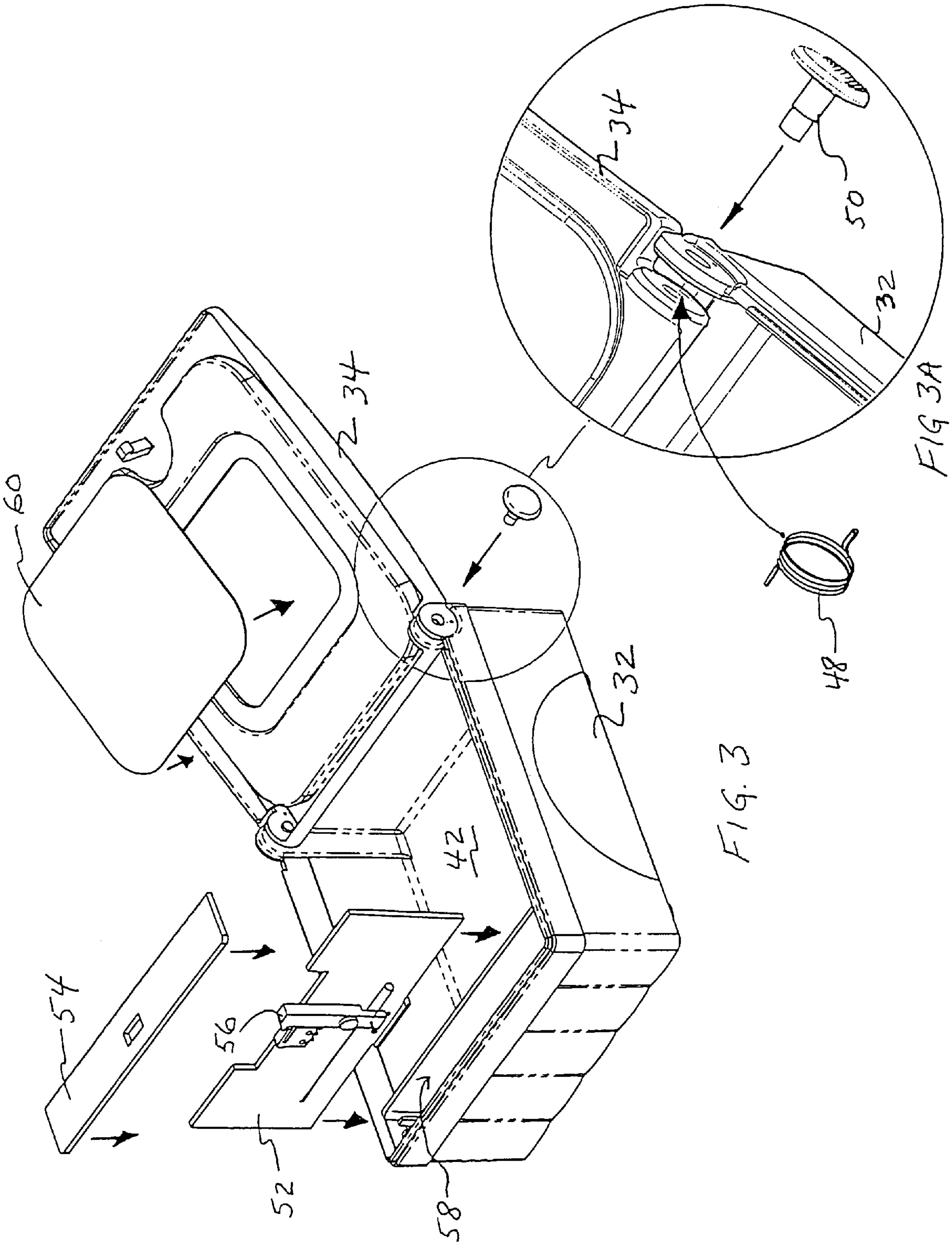
FIG. 3 shows a partial, exploded view of the receptacle of FIG. 1.
FIG. 3A shows an enlarged, detailed view of a portion of the receptacle of FIG. 3.

The receptacle 30, may also include a label 36 for identification of the contents within the receptacle and/or some or all of top 34 may be transparent. In FIGS. 3 and 3A, the receptacle 30 is shown in greater detail. The hinge assembly 40 includes a spring 48 and a pin 50 which join the receptacle compartment with the top 34. While a hinged top is preferred, a sliding top may be used. The receptacle 30 may further include a compartment 58 for housing a latch assembly 52. The latch assembly 52 may include a latch member 56 and a cover 54.

Figure 4:
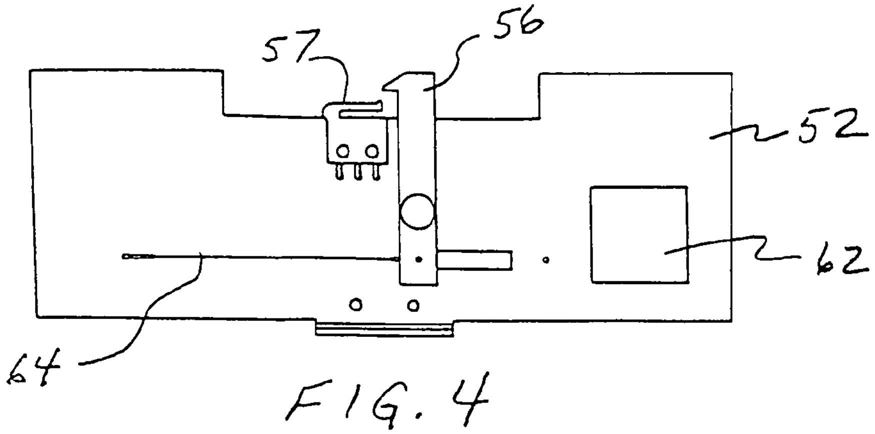
FIG. 4 shows a plan view of a latch assembly of a preferred embodiment of the receptacle of FIG. 1.
Figure 5:
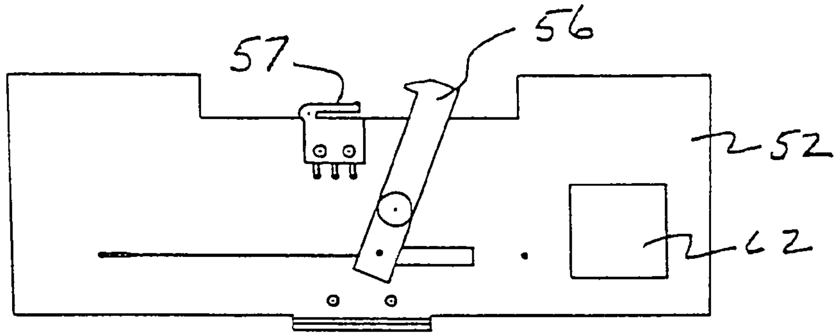
FIG. 5 shows the latch assembly of FIG. 4, shown in the open position.
Figure 6:
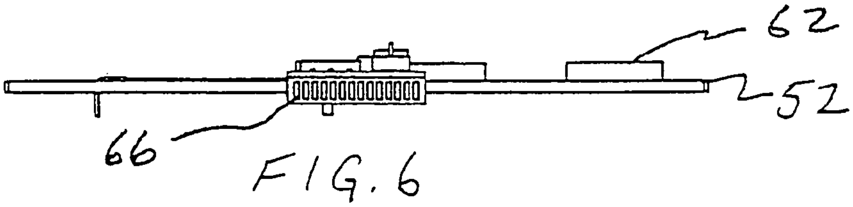
FIG. 6 shows a side elevation view of the latch assembly of FIG. 4.
Figure 7:
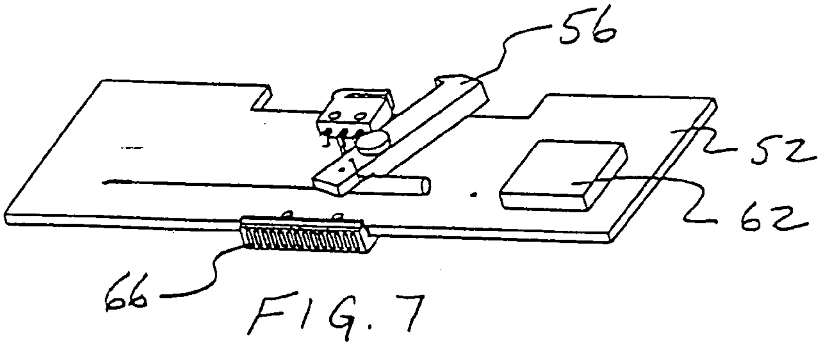
FIG. 7 shows a perspective view of the latch assembly shown in FIG. 5.

The latch assembly is shown in greater detail in FIGS. 4-7. FIG. 4 shows the latch member 56 in a closed position while FIG. 5 shows the latch member 56 in an open position. A switch 57 may electronically inform an automated dispensing machine computer that the top 34 is in an open or closed position. A memory chip 62 may store information concerning the receptacle. This memory chip 62 may store a wide variety of information, including the data in the Hearst Corporation's National Drug Data File, as shown in Table 1, such as expiration date, lot number, NDC number, type of drug or medical supply dosage, size of packages, number of items in the packages, etc. The memory chip 62 can also store information about the receptacle 30, including, when it was put in service, how many times it has been used, etc. This is beneficial because the receptacles 30 will have a limited useful life and it is desirable to take receptacles out of service before they fail (e.g., hinge breaks, latch breaks, etc.).

The receptacle 30 itself may be a medication package that contains drugs and a package insert. The receptacle 30 may replace bottles and other types of standard medication packages. An electrical communication contact 66 enables connection from the receptacle to a receiving location within an automated dispensing machine, thus facilitating communication between the receptacle and the computer associated with the automated dispensing machine. When required signals are received at the electrical contact 66 from the automated dispensing machine, an electronic circuit, such as the one shown in FIG. 22, actuates a muscle wire 64 causing the latch to be actuated and thus opening the top 34. The muscle wire works by receiving a current and upon increasing in temperature the wire 64 pulls to one side by shrinking and thereby causes the latch to be susceptible to a spring force acting upon it from a spring in the hinge assembly 40. The spring 48 pushes the top open when the latch is freed. In a preferred embodiment, the lid or top 34 will pop open about 15 degrees when the latch is opened.

An advantage of having the latch assembly as a separate component that can be removed from the receptacle 30 is that the latch assembly 52 and its components are more expensive and have a longer life expectancy than the storage compartment part of the receptacle 30. Therefore, the latch assembly 58 can be reused if the rest of the receptacle cracks or breaks (e.g., hinge breaks, etc.). The latch assembly preferably cannot be removed unless the top is opened.

Figure 8:
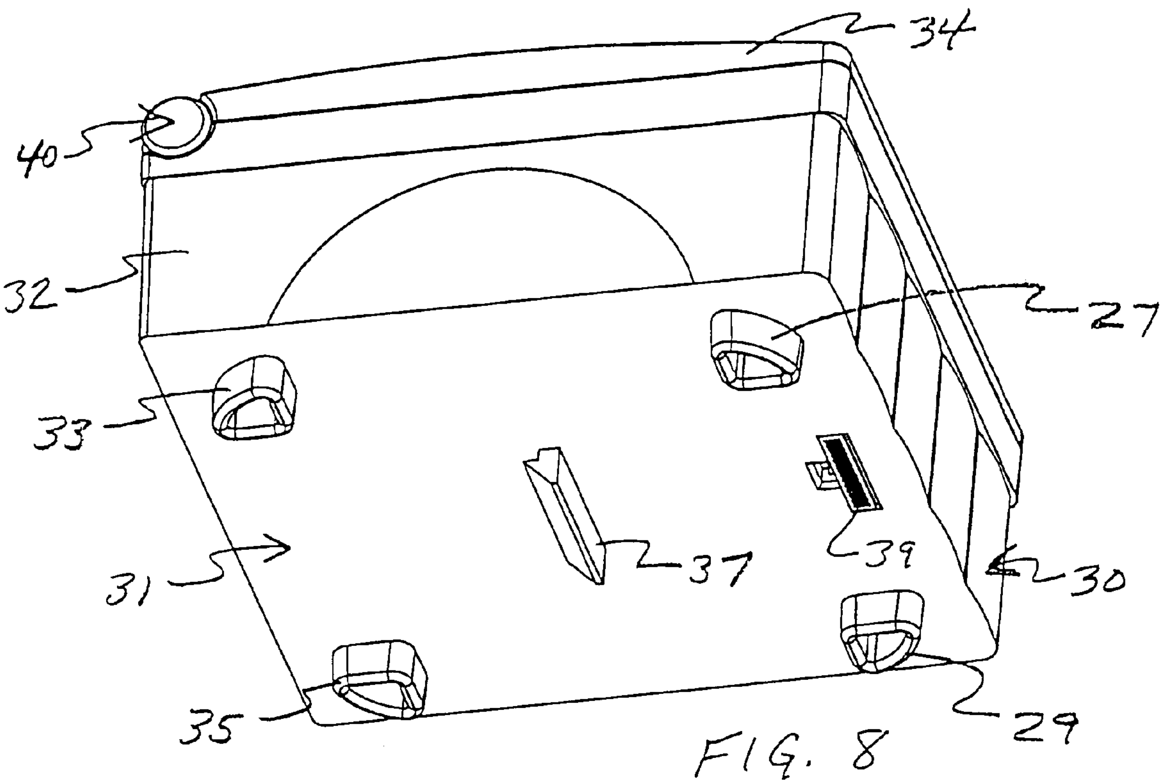
FIG. 8 shows a perspective view of the receptacle of FIG. 1, shown from a bottom perspective view.
Figure 9:
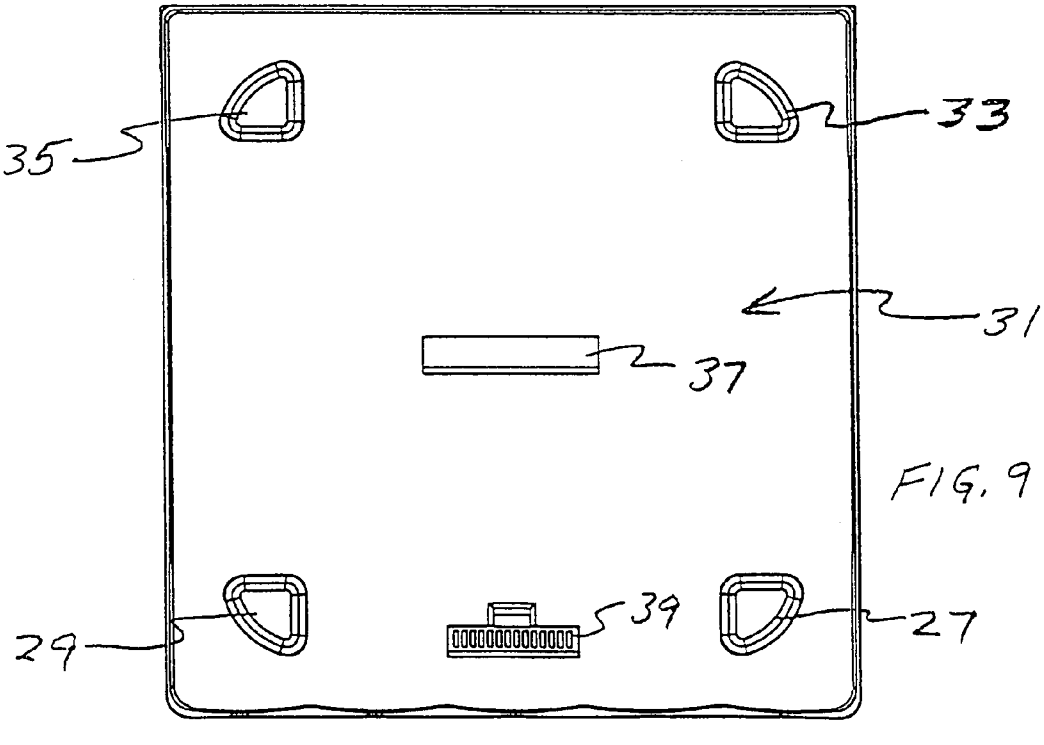
FIG. 9 shows a bottom plan view of the receptacle shown in FIG. 8.

FIGS. 8 and 9 show a bottom portion of the receptacle 30. Each receptacle may include legs 27, 29, 33 and 35 as well as a hook member 37 for engagement of the receptacle to a location, such as in an automated dispensing machine. Alternatively, the legs themselves may include catching or engagement features. An opening 39 enables contact by the electrical connection 66 with a port at the automated dispensing machine.

Figure 10:
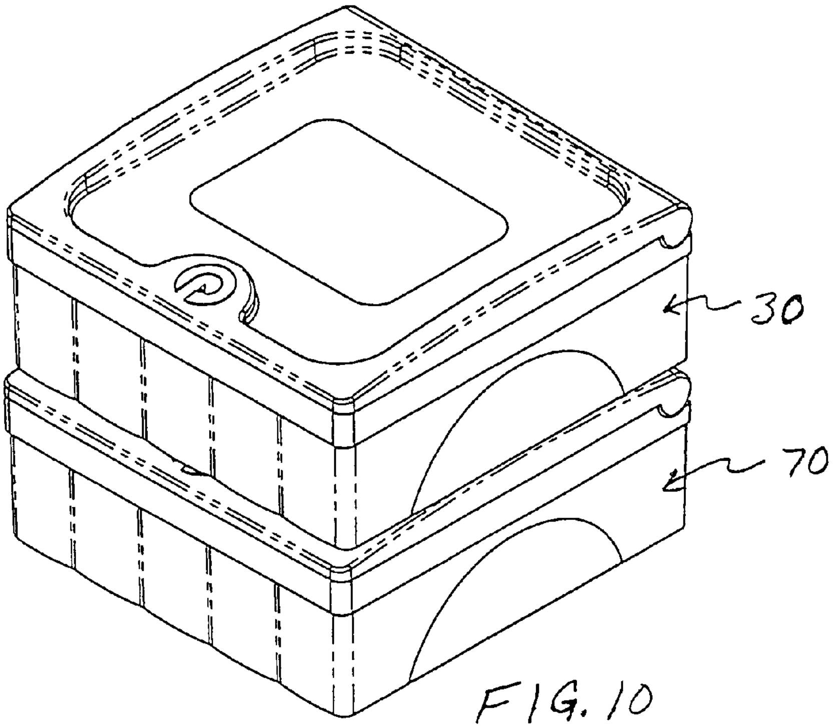
FIG. 10 shows another embodiment of the present invention in which the receptacle shown in FIG. 1 is stacked on a similar receptacle.
Figure 11:
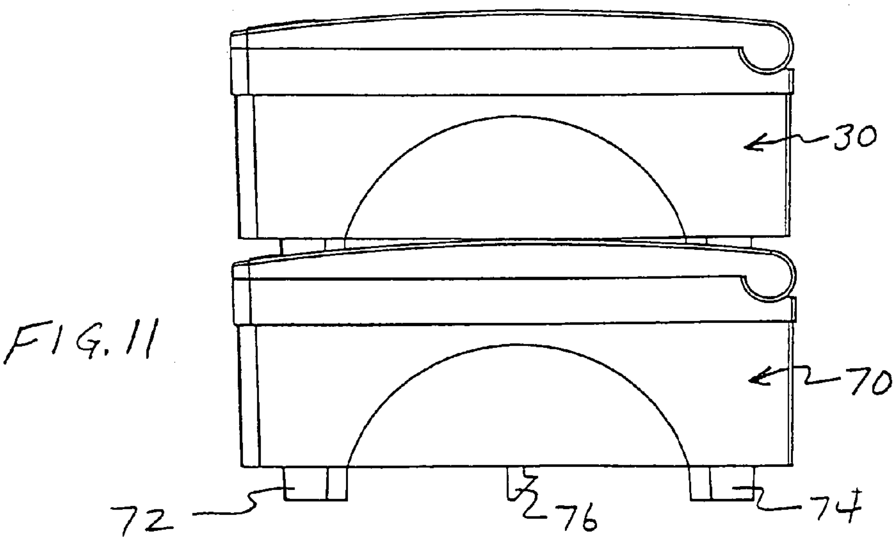
FIG. 11 shows a side elevation view of the stacked receptacles of FIG. 10.
Figure 12:
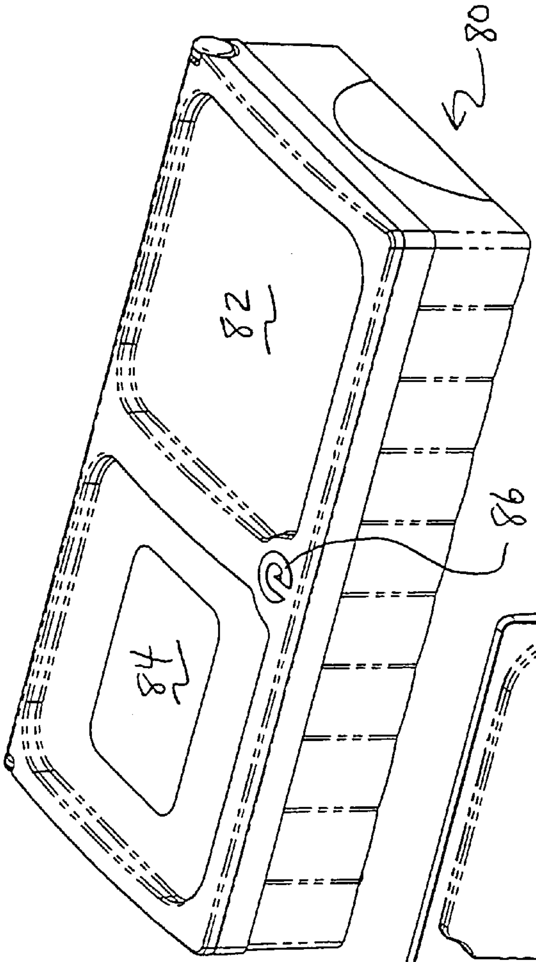
FIG. 12 shows a perspective view of another preferred embodiment of the present invention.
Figure 13:
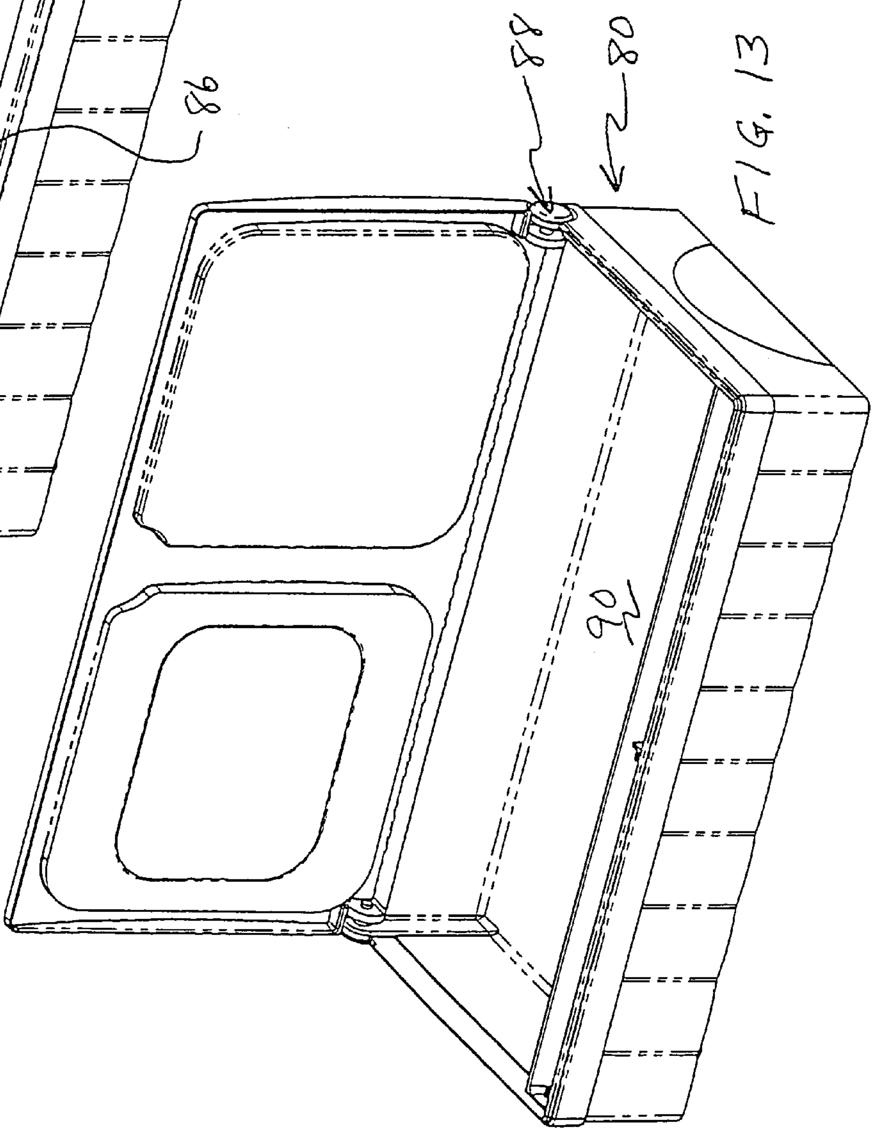
FIG. 13 shows a perspective view of the receptacle of FIG. 12, shown in the open top position.

FIGS. 10-13 show other features of the present invention. In FIGS. 10 and 11, the receptacle 30 is shown stacked upon a similar receptacle 70. Legs 72 and 74 of receptacle 70 may be designed to reside within a location within an automated dispensing machine and/or within an area on a top surface of another receptacle. This allows for stacking of receptacles on each other for ease of storing and transportation. FIG. 12 shows a double-wide receptacle 80 with top surfaces 82, 84 and latch 86. FIG. 13 shows the interior compartment of receptacle 80 as well as hinge assembly 88. It is to be appreciated that the receptacles may come in a variety of sizes and shapes according to the particular use and storage location they are intended for. The receptacles are preferably modular in design to enable them to be used in combination, for example in a drawer of an automated dispensing machine, with several other similar receptacles, fitting in close proximity to one another to efficiently use the space available in each drawer.

Figures 14, 14A, 14B:
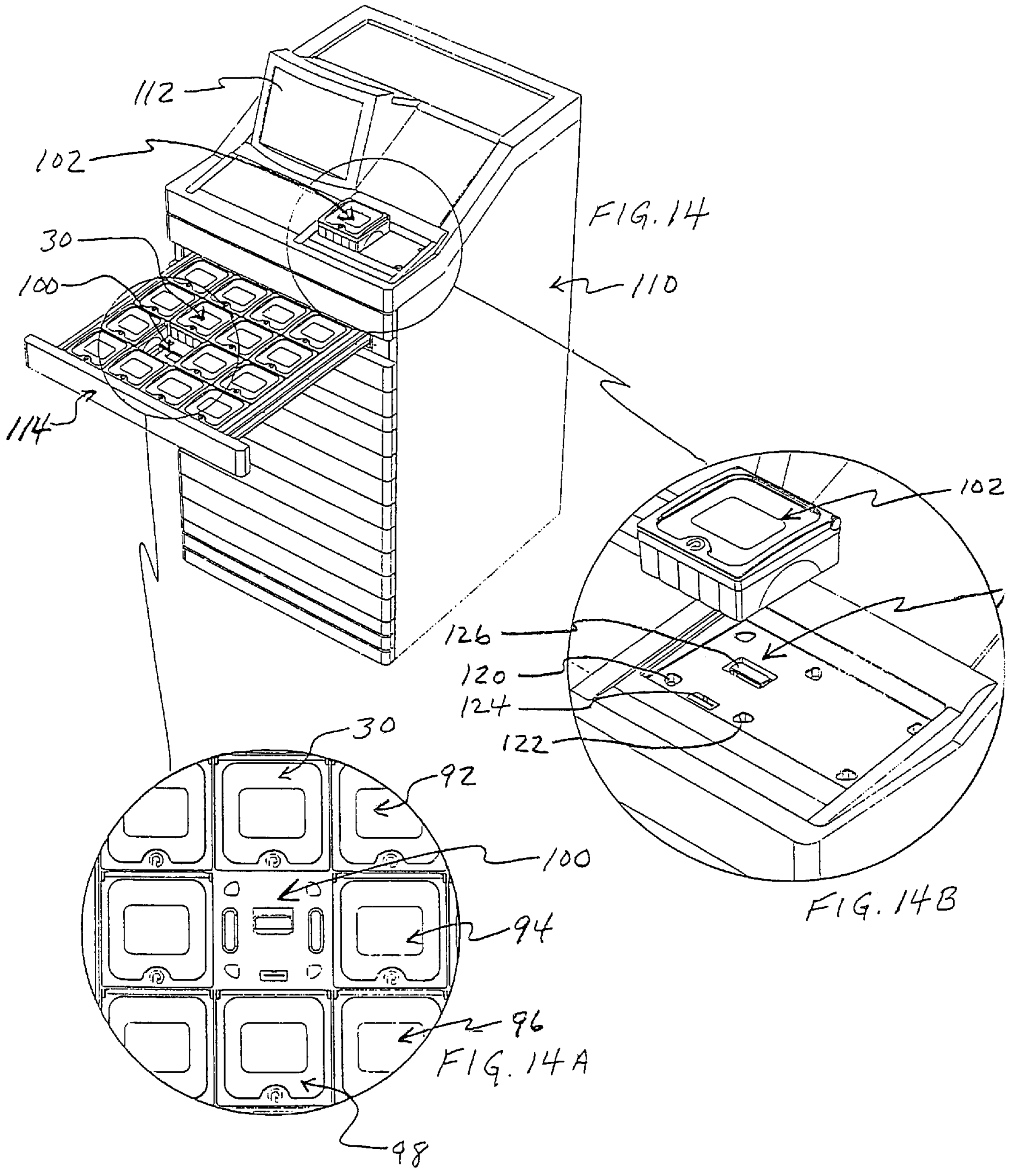
FIG. 14 shows a perspective view of an embodiment of the present invention in which receptacles such as the receptacle shown in FIG. 1 are loaded into an automated dispensing machine.
FIG. 14A is an enlarged detailed view of a receptacle receiving location within the automated dispensing machine assembly shown in FIG. 14.
FIG. 14B shows an enlarged perspective detail view of a docking station of the automated dispensing machine assembly shown in FIG. 14.

FIGS. 14, 14A and 14B show views of the receptacles of the present invention installed within an automated dispensing machine 110. Zones or locations 100 within a drawer 114 of the dispensing machine 110 are adapted to receive receptacles, such as receptacle 102. A terminal display 112 may be provided with the machine 110 to enable an operator to review displayed information. A keypad 113 may be provided at the dispensing machine 110 to enter certain required information. A docking station 104 may be provided at the dispensing machine 110 for receiving receptacles, such as receptacle 102 within engagement receiver 126, leg receivers 120, 122 and electrical port 124. In this manner, each receptacle, such as receptacle 102, may be docked at the machine 110 to enable certain information stored within the memory of the receptacle to be downloaded into a processor or computer associated with the machine 110. If the receptacle 102 is to be loaded into a drawer 114 of the dispensing machine 110, the drawer 114 may pop open to allow the receptacle 102 to be loaded into the correct zone 100 of the drawer 114.

Figure 15B:
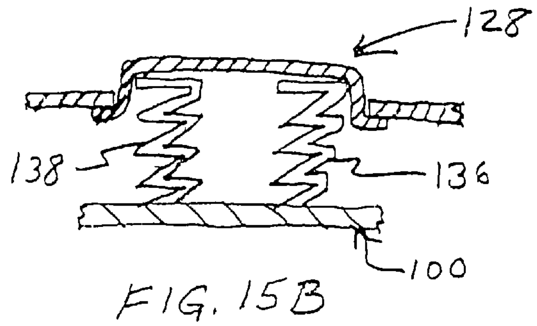
FIG. 15B shows a partial elevation view of a spring subassembly shown in FIG. 15A.
Figure 15:
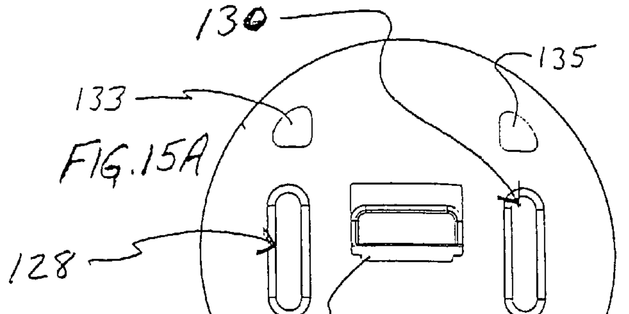
FIG. 15 shows a partial perspective view of a drawer tray of the automated dispensing machine shown in FIG. 14.
Figure 15:
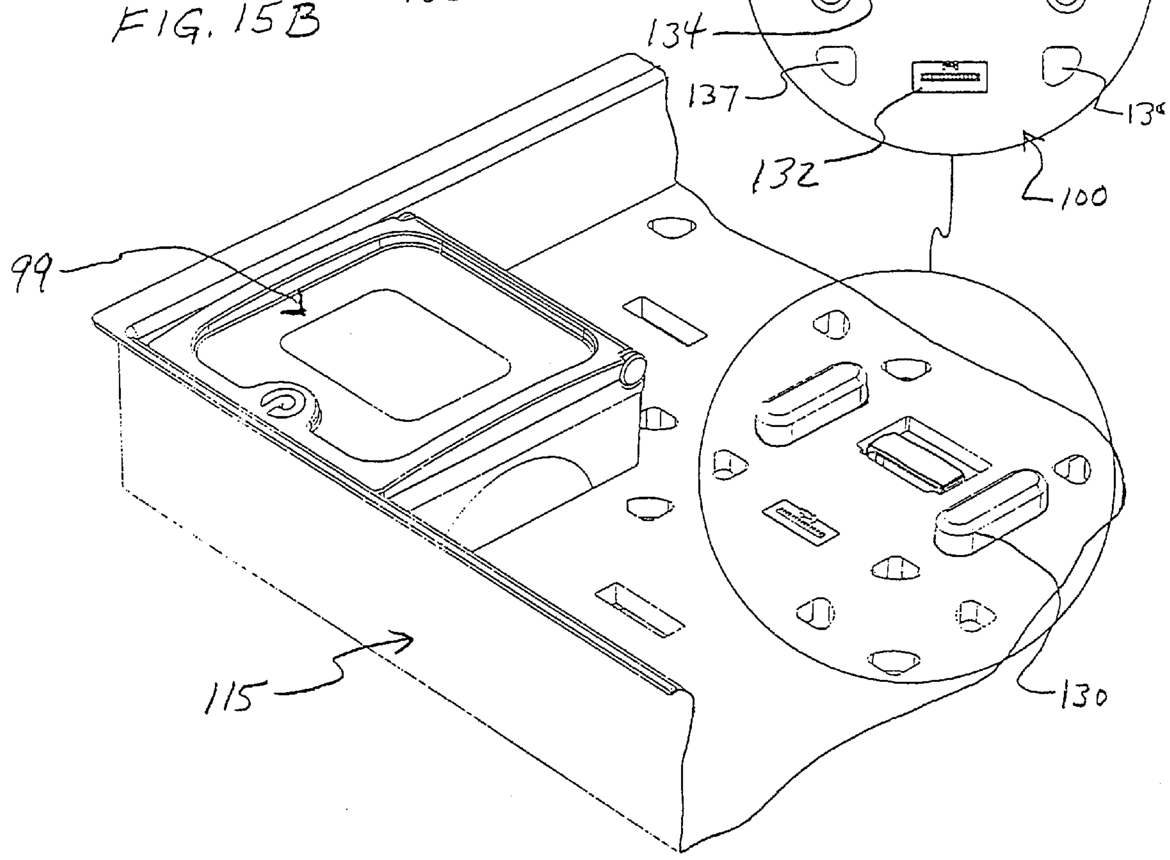

Within each drawer 114, there may reside a tray 115 for holding receptacles 99, etc. Individual zones 100 are adapted to receive individual ones of said receptacles. Spring assemblies 130, 128 function in a manner to be described hereinafter. The spring assembly 128 is shown in greater detail in FIG. 15B to include springs 136 and 138.

Figure 16:
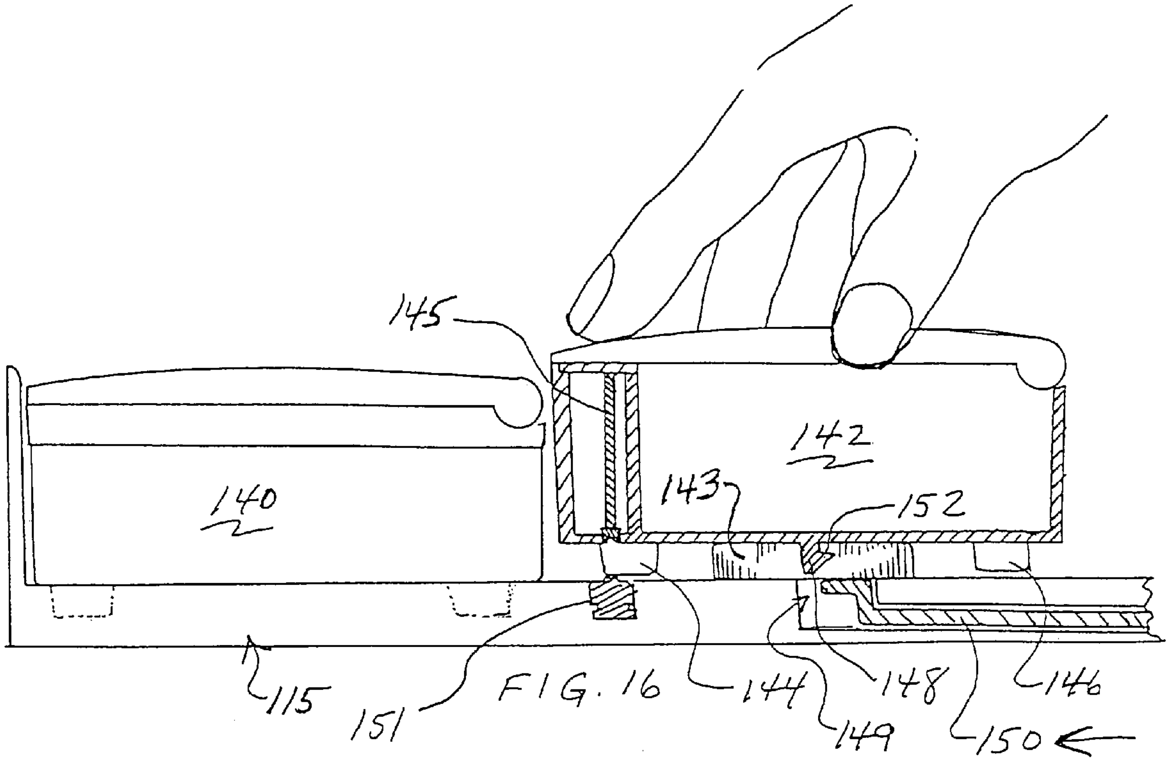
FIG. 16 shows a side elevation view of the insertion of a receptacle into a drawer of an automated dispensing machine.
Figure 17:
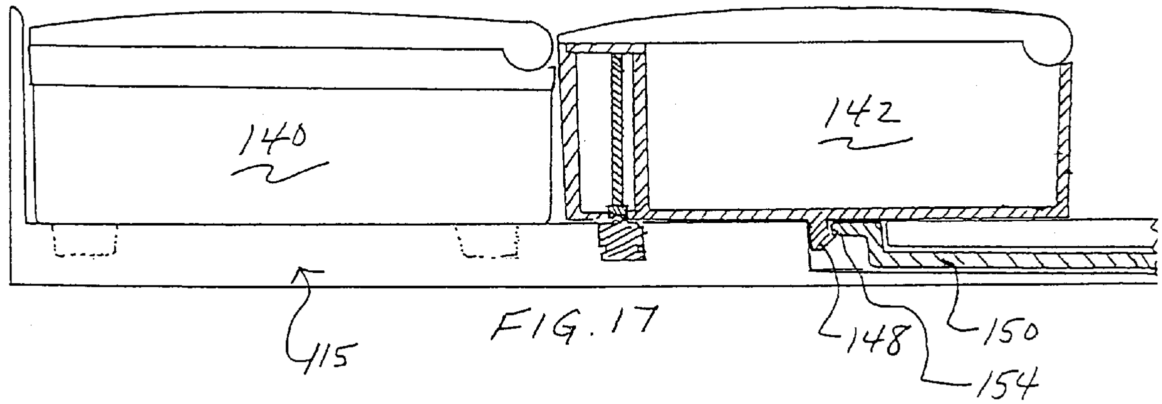
FIG. 17 shows a side elevation view of the receptacle shown in FIG. 16, now fully inserted into the drawer.
Figure 18:
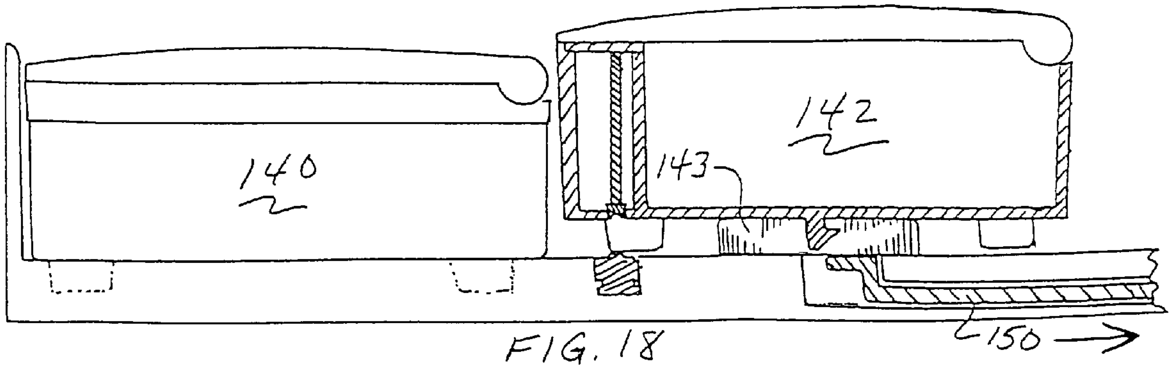
FIG. 18 shows a side elevation view of the receptacle shown in FIG. 17, now released by the latch for removal.

Zone 100 shown in FIG. 15A also includes pockets 133, 135, 137 and 139 for receiving the legs of a receptacle. FIGS. 16, 17 and 18 show the insertion, locking, and release, respectively, of a receptacle 142 being placed into a drawer tray 115. A nested or adjacent receptacle 140 is also shown already in place. Compression spring 143 is shown in its relaxed state in FIGS. 16 and 18 and is compressed and not in view in FIG. 17. Latch member 145 is shown in cross section view in contact with electrical circuit 151. Latch engagement member 150 is shown in FIG. 16 in a position ready to receive the retaining hook 152 of engagement member 148 of receptacle 142. As shown in FIG. 17, when the engagement member 148 is depressed into the area 149 (shown in FIG. 16), it catches or engages the end 154 of latching engagement member 150. In FIG. 18, latch engagement member 150 is actuated away from the engagement member 148 (moved to the right as shown in FIG. 18), thereby releasing the connection between the engagement member 148 and the latch engagement member 150 which allows the spring 143 to return to its relaxed state pushing receptacle 142 up and out of zone 100 to enable an operator to remove the receptacle from the machine 110. The actuation of the latch engagement member 150 away from the engagement member 148 may be done by a muscle wire mechanism such as in FIG. 22 or by other suitable means.

Figure 19:
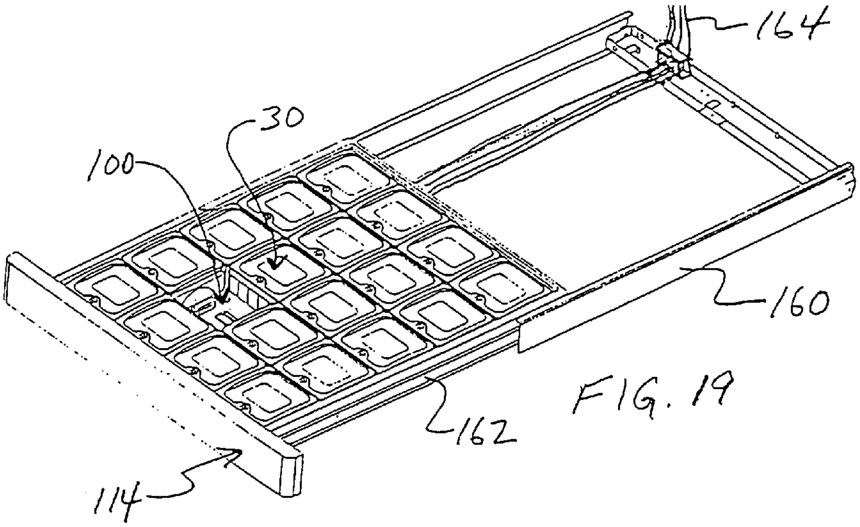
FIG. 19 shows a perspective view of a drawer sub-assembly of the automated dispensing machine shown in FIG. 14.
Figure 20:
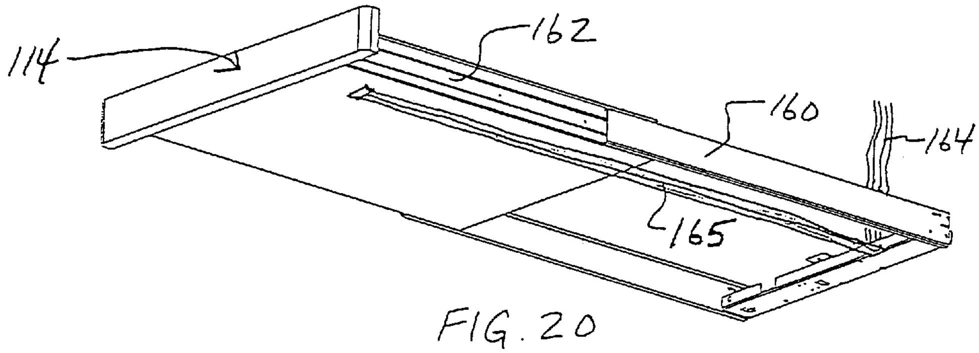
FIG. 20 shows another perspective view of the drawer sub-assembly of FIG. 19, shown from a bottom perspective.
Figure 21:
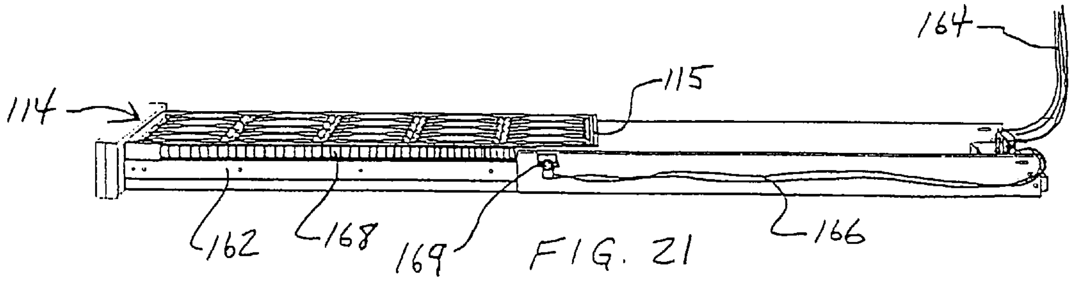
FIG. 21 shows a side perspective view of the drawer sub-assembly shown in FIG. 19.

FIG. 19 shows a drawer 114 with a track 160 and rail 162 that is adapted to reside within the machine 110. Wires 164 lead from a processor within the machine 110, along, for example, path 165 to each of the zones, such as zone 100, to carry communication between the receptacles 30 and the machine computer. FIGS. 20 and 21 show other views of the drawer 114. In FIG. 21, a grid 168 may be installed along the rail 162 to be read by sensor 169 so that the computer aboard the machine 110 knows how far each drawer 114 has been pulled out of the machine, thereby exposing rows of receptacles 30. The sensor 169 may be an optical sensor or other suitable sensor adapted to read the bars or grids of 168 and communicate that information via wires 166 and through wires 164 to the computer. In another embodiment, RF communication links may be used instead of or in addition to, wires 166 and 164. In accordance with a preferred embodiment of the present invention, the drawer will be open before the top of the receptacle is popped open or the receptacle itself is popped up to be removed from the drawer.

Figure 22:
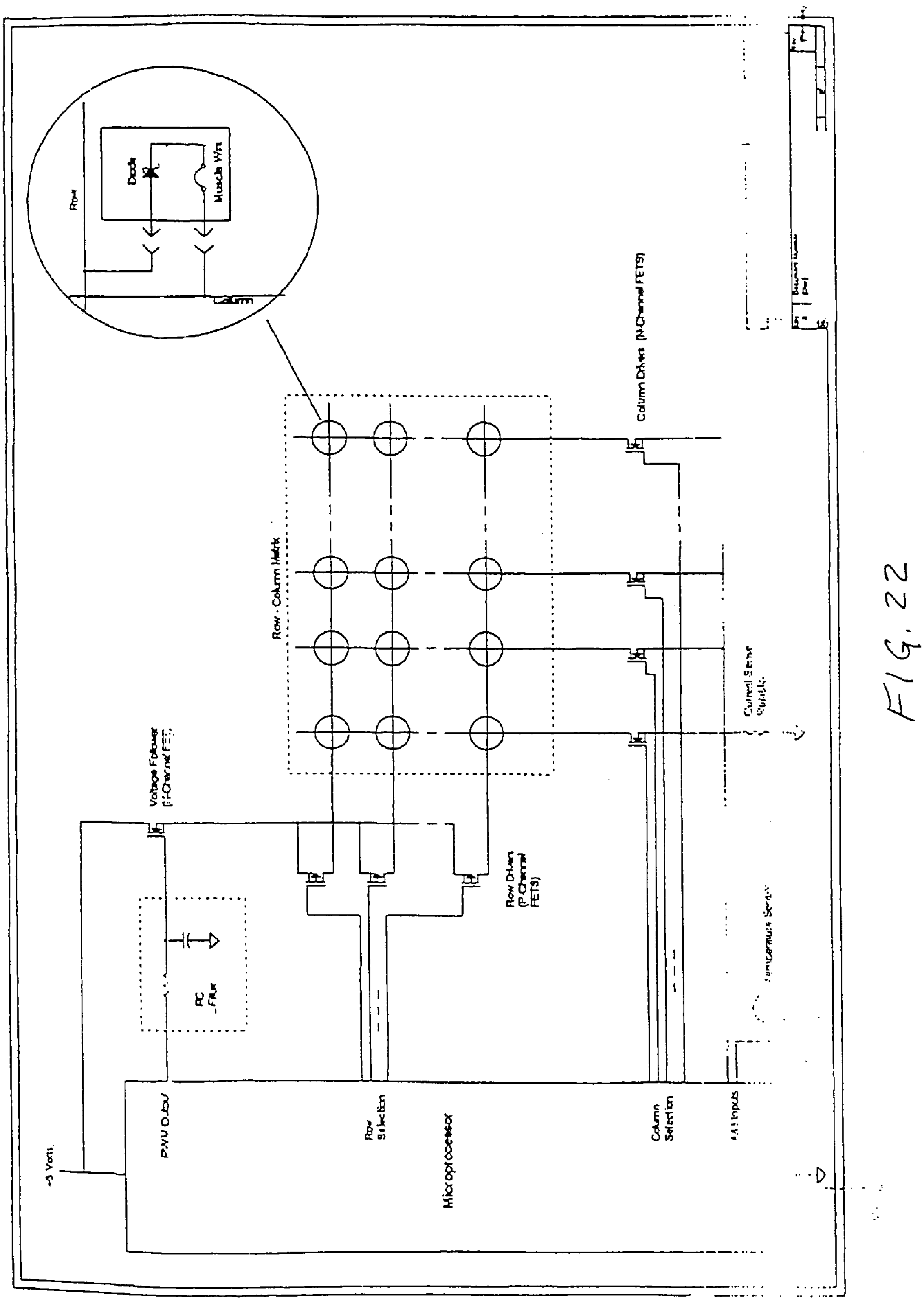
FIG. 22 shows an electrical schematic of a preferred embodiment of the latch assembly of the receptacle of the present invention.

FIG. 22 shows a preferred embodiment of an electrical wiring circuit for use with the latch assembly of each receptacle 30. The circuit communicates with the muscle wire which controls the movement of the latch to enable the door to open on each receptacle. The inputs to the circuit may be from the computer onboard the machine 110. When an operator enters required information to access a receptacle, the computer may send the necessary signal to the receptacle via the circuit to open the latch. As stated above, the latch may be opened by spring force applied when the muscle wire retracts under current to free the latch for movement.

In one preferred embodiment of the latch assembly of the present invention a microprocessor is used. The microprocessor may include an analog to digital converter (A/D) and a pulse width modulator (PWM). The PWM produces a fixed frequency, variable duty cycle output. It is fed into a RC filter which produces a DC voltage between zero and five volts, depending on the duty cycle. A voltage follower, n-channel FET, a bipolar transistor, or other kind of amplifier circuit is preferred to drive the muscle wire. The FET's are used to address a single muscle wire. The row drivers are p-channel FET's that supply the current generated by the voltage follower. The microprocessor outputs zero volts to the gate of the desired row and plus five volts to the rest. The column drivers are n-channel FET's that sink current to ground. The microprocessor outputs plus five volts to the gate of the desired column and zero volts to the rest. In a matrix of muscle wires, each wire has a diode in series with it to isolate it from the other muscle wires in the matrix. The current sense resistor generates a feedback voltage to the microprocessor proportional to the amount of current flowing in the muscle wire. The temperature sensor generates a voltage proportional to the ambient temperature.

The algorithm in the microprocessor is preferably structured as follows:

1. Select the desired row and column drivers.
2. Read temperature sensor.
3. Determine starting duty cycle and desired feedback target as a function of temperature (may be done via a look-up table).
4. Start the PWM generator.
5. Read the feedback voltage.
6. Compute error=(current feedback reading)−(desired target)
7. If error less than zero, the output current is too low, increase duty cycle.
8. If error greater than zero, the output current is too high, decrease duty cycle.
9. If error equals zero, do not adjust duty cycle.
10. If duty cycle cannot be increased, circuit may be broken. Shut off the PWM generator and report error to system.
11. If the duty cycle is below a predetermined threshold, there may be a short-circuit. Shut off the PWM generator and report error to system.
12. Check elapsed time since muscle wire was energized. If above desired time, shut off PWM generator.
13. Wait for PWM value to stabilize.
14. Go back to step 5.

Figure 23:
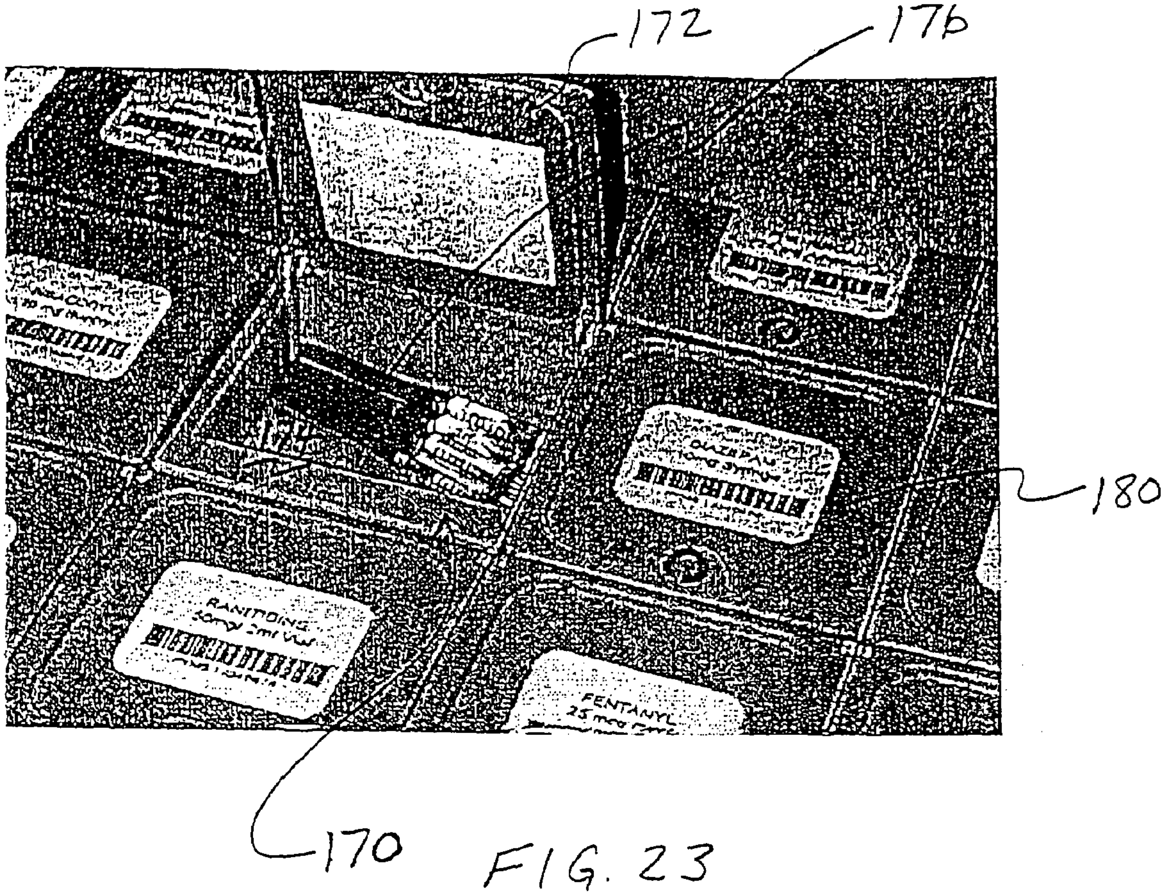
FIG. 23 shows a pictorial view of a plurality of nested receptacles, with one receptacle open, revealing its contents.

FIG. 23 shows a group of configured receptacles 170 and 180, for example. The top 172 is open exposing the internal compartment 174 and in this example, syringes containing a predetermined drug 176 are shown inside the compartment 174. Visible on the surface of each top of each receptacle is a label with printed drug information on the label as well as a bar code containing additional information about the item contained within that particular receptacle.

It should be appreciated from the foregoing description that the present invention is useful in the medical drug and supply field, however, the present invention has applicability to a broad range of industries apart from the medical industry, where similar inventory control and security measures are preferred. The present invention is not intended to be limited to the medical supply and drug industry.

Figure 24:
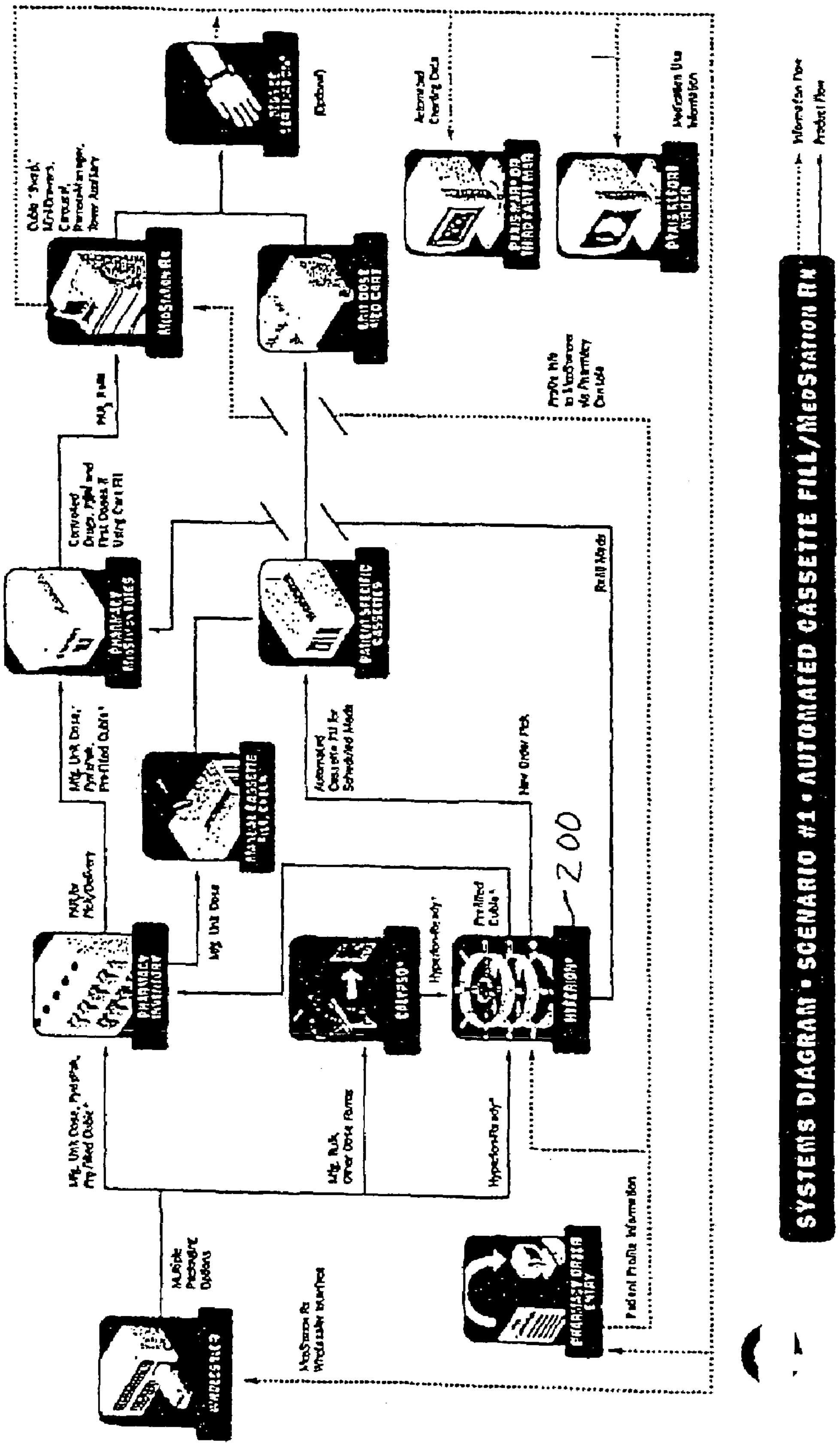
FIG. 24 shows a diagrammatical representation of a preferred system of the present invention.
Figure 25:
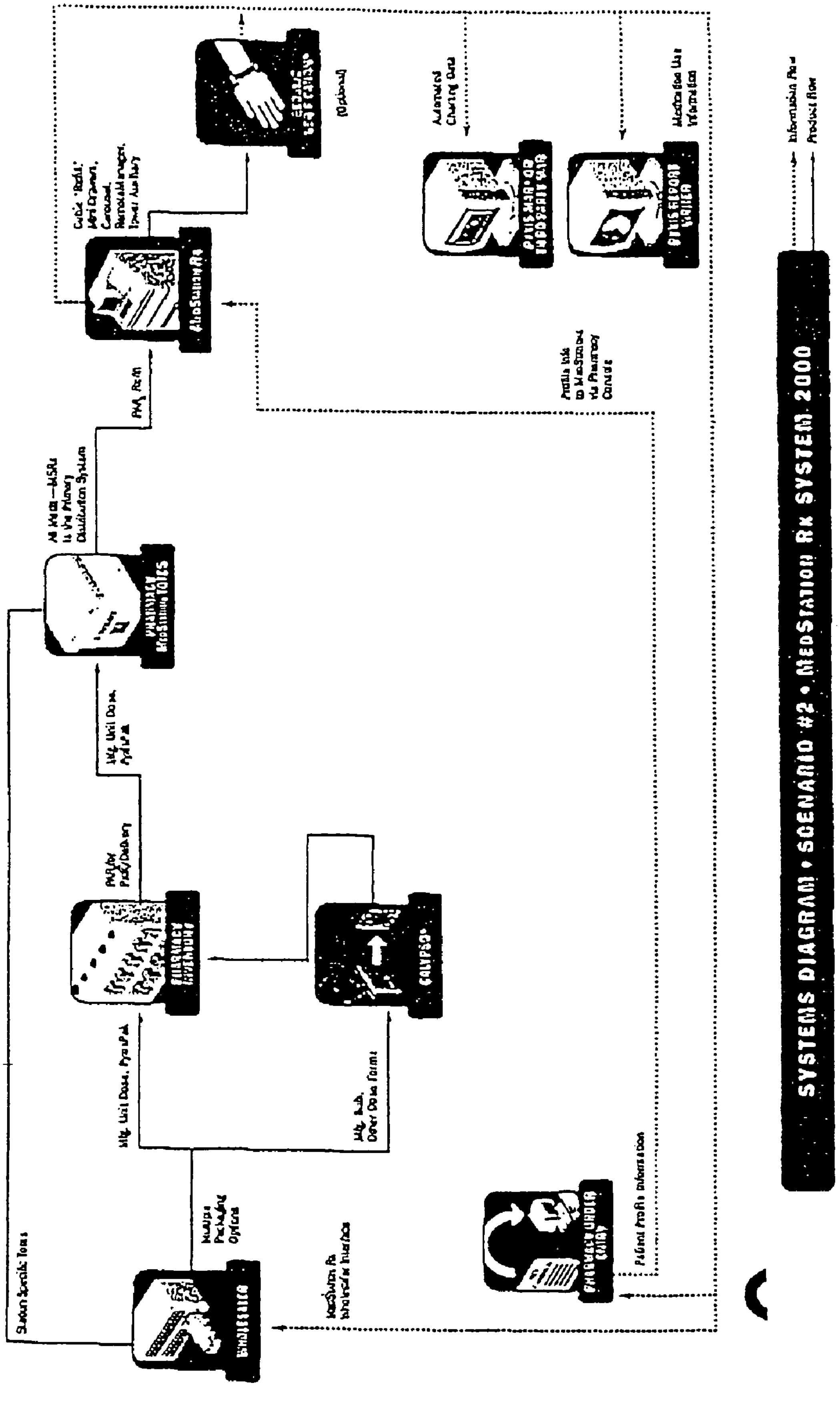
FIG. 25 shows a diagrammatical representation of a second preferred system of the present invention.
Figure 26:
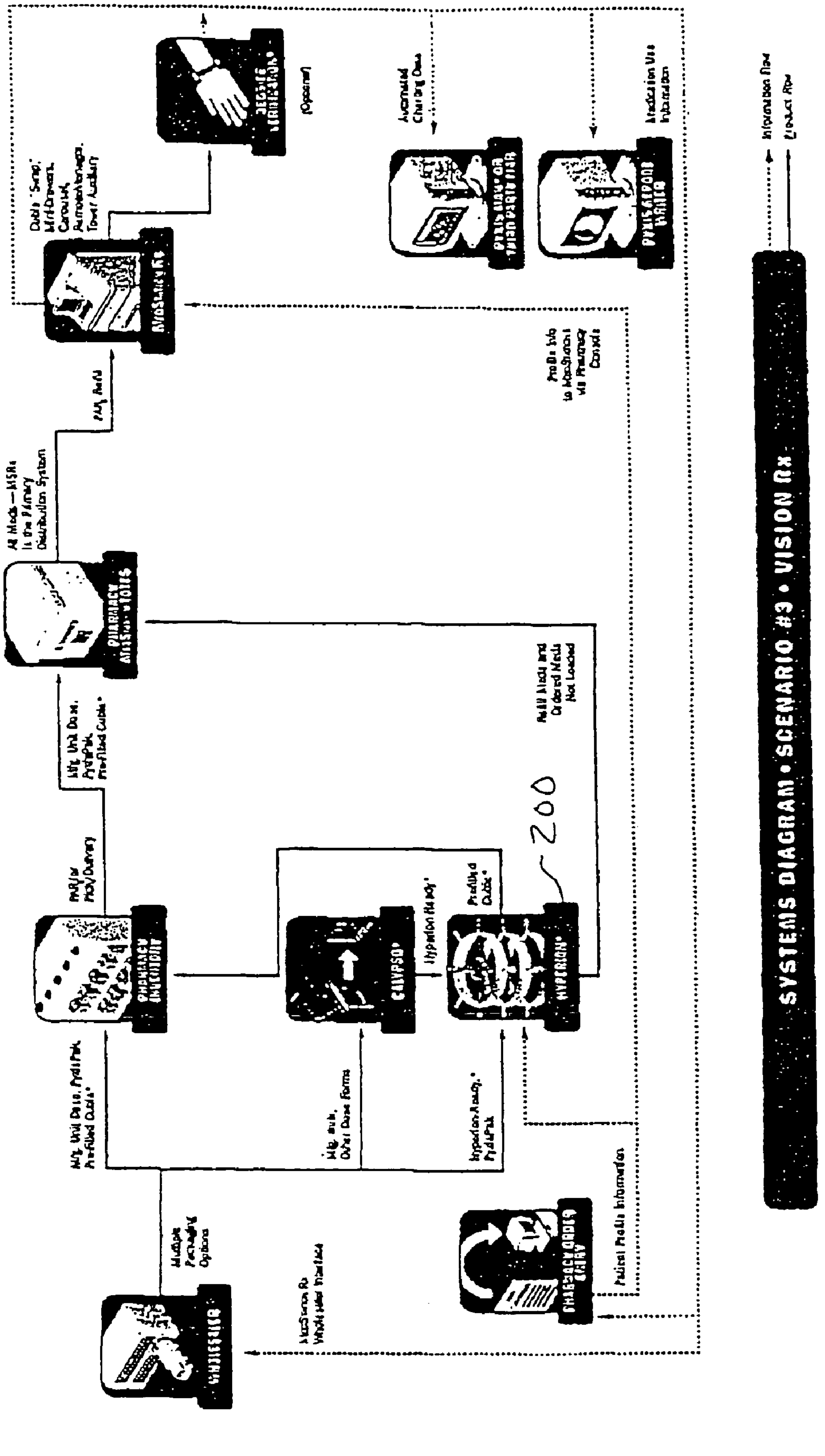
FIG. 26 shows a diagrammatical representation of a third preferred system of the present invention.
Figure 27A:
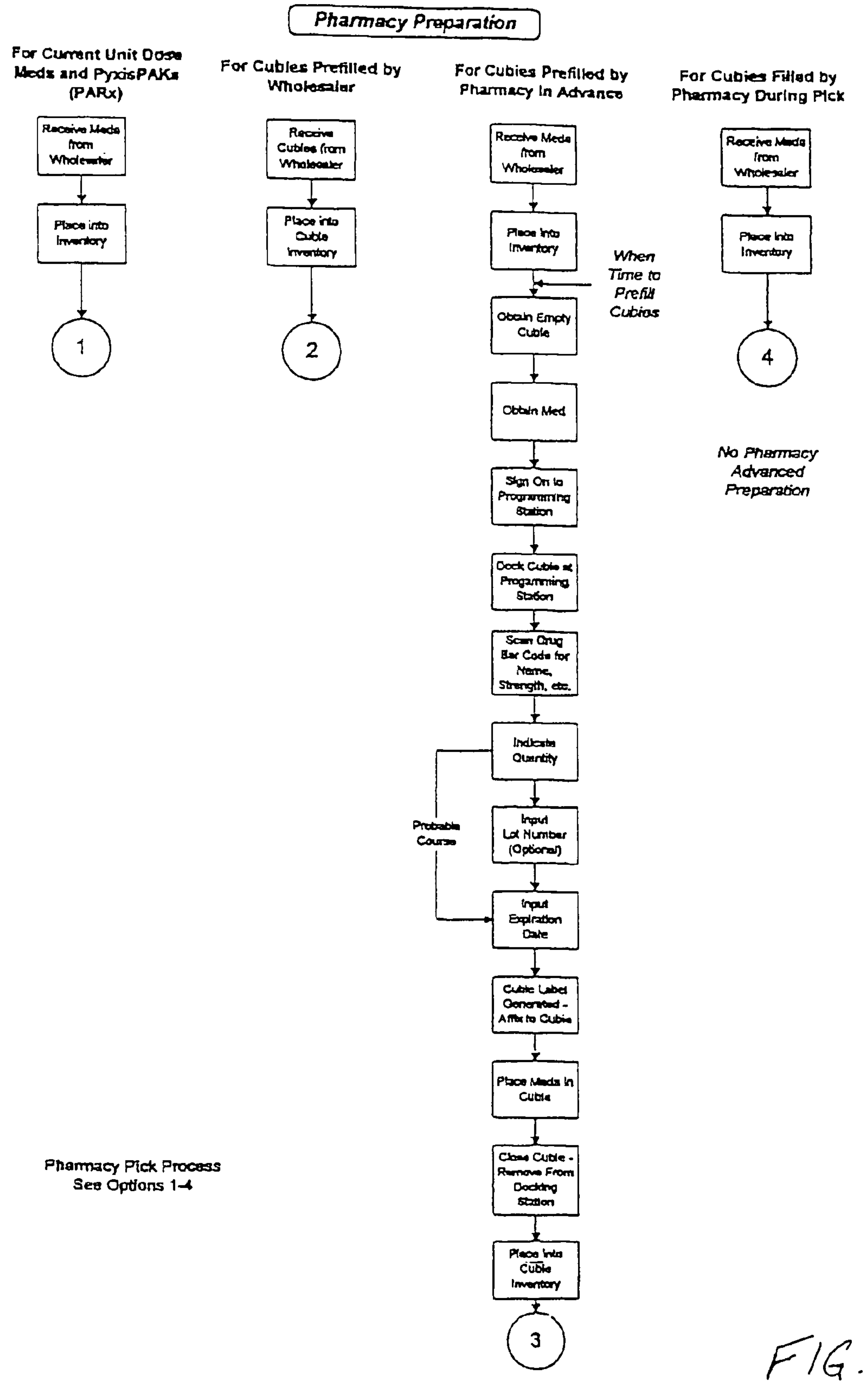
FIG. 27A shows the beginnings of four flow diagrams of a pharmacy preparation procedure that may have applicability to the present invention.
Figure 27B:
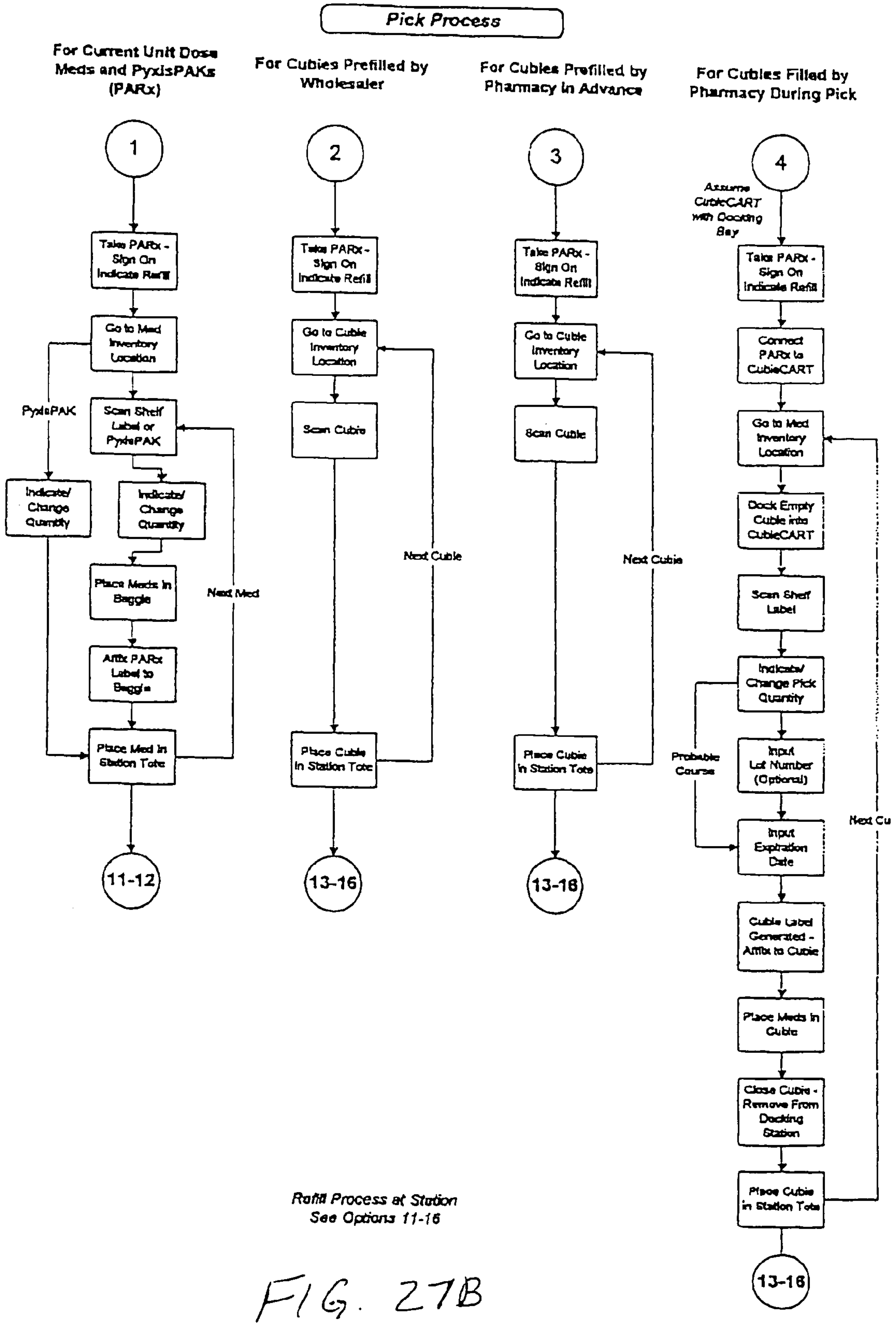
FIG. 27B shows the continuation of FIG. 27A through a pick process that may have applicability to the present invention.
Figure 27C:
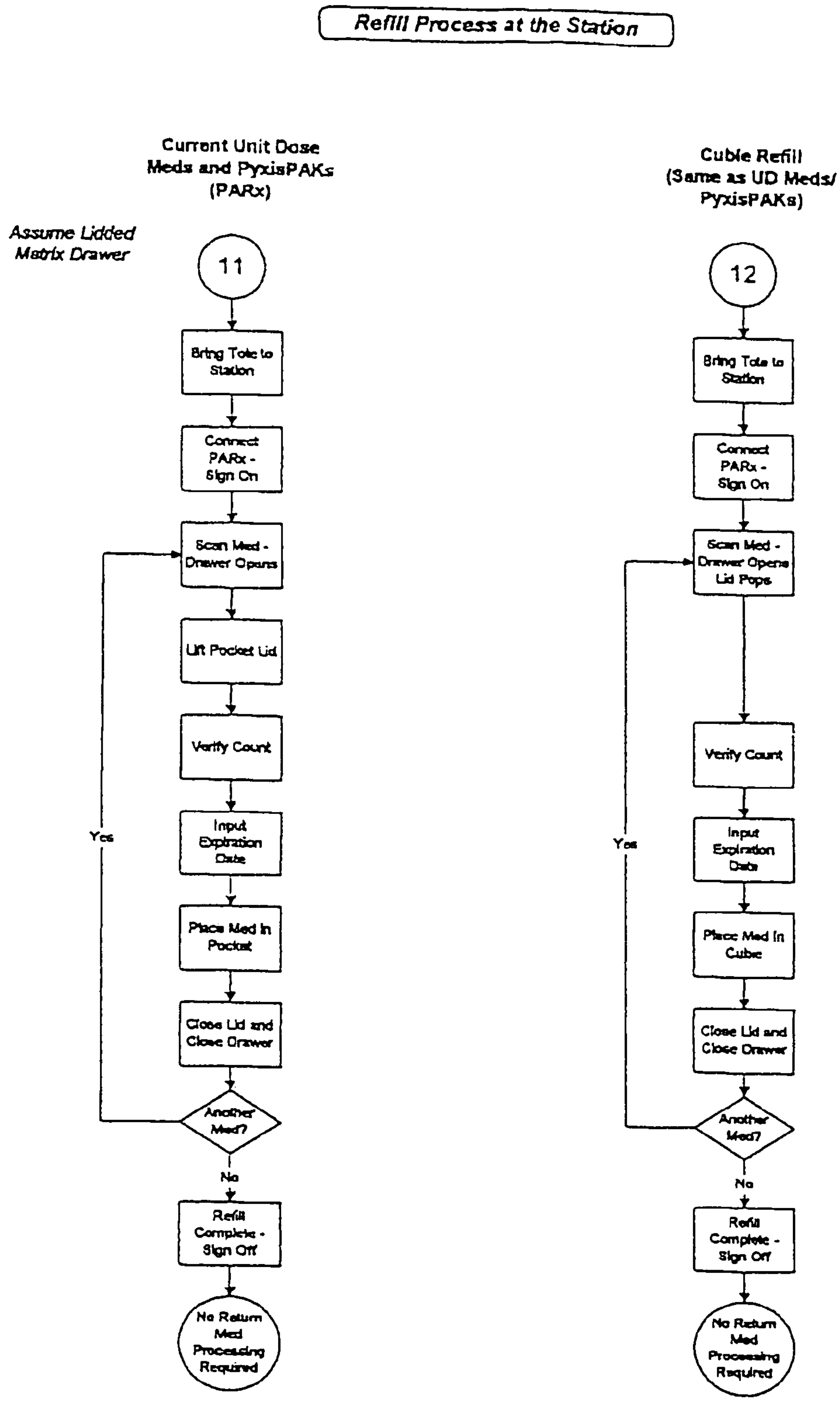
FIG. 27C shows the continuation of FIG. 27B through a refill process that may have applicability to the present invention.
Figure 27D:
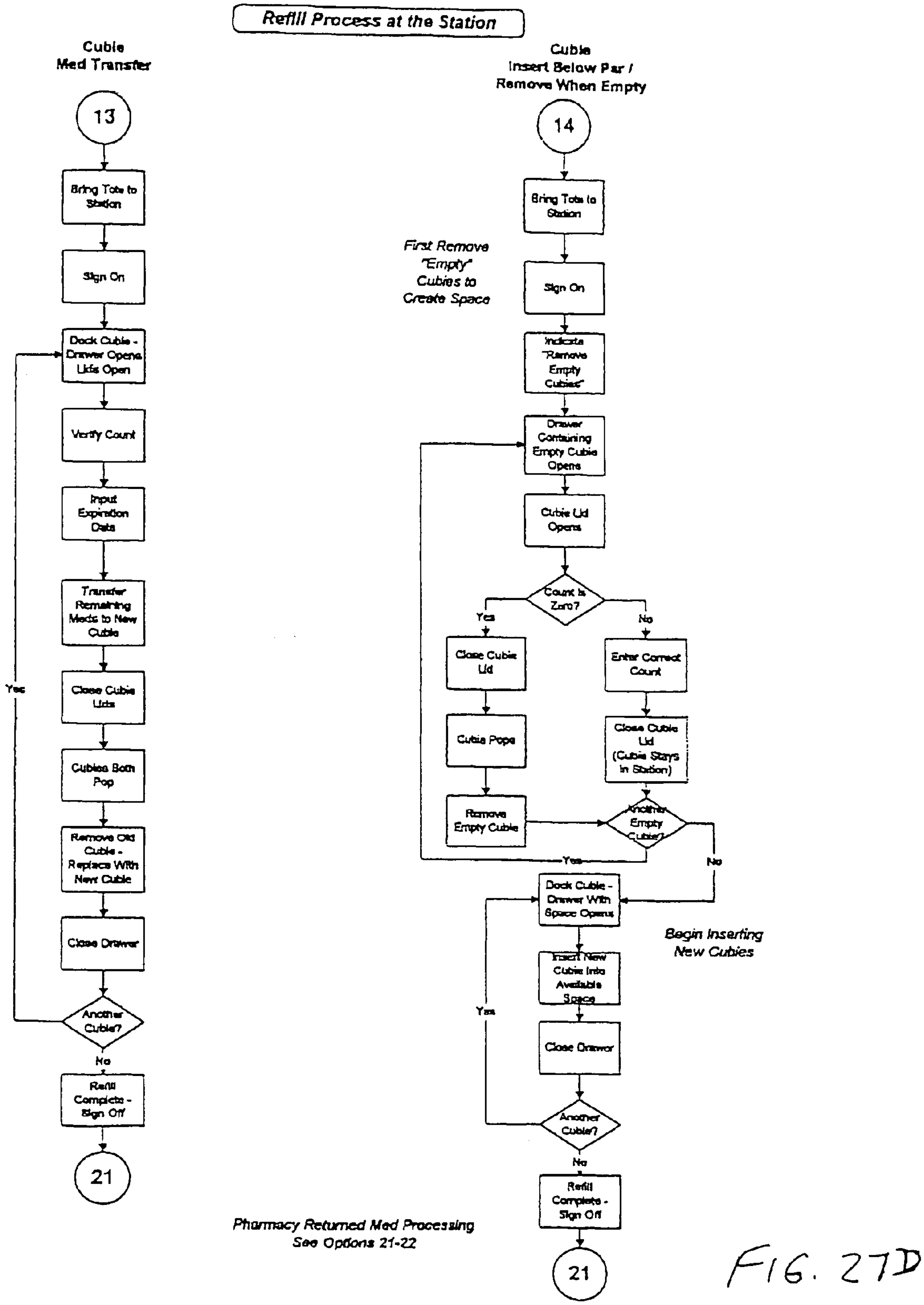
FIG. 27D shows another continuation of FIG. 27B through a refill process that may have applicability to the present invention.
Figure 27E:
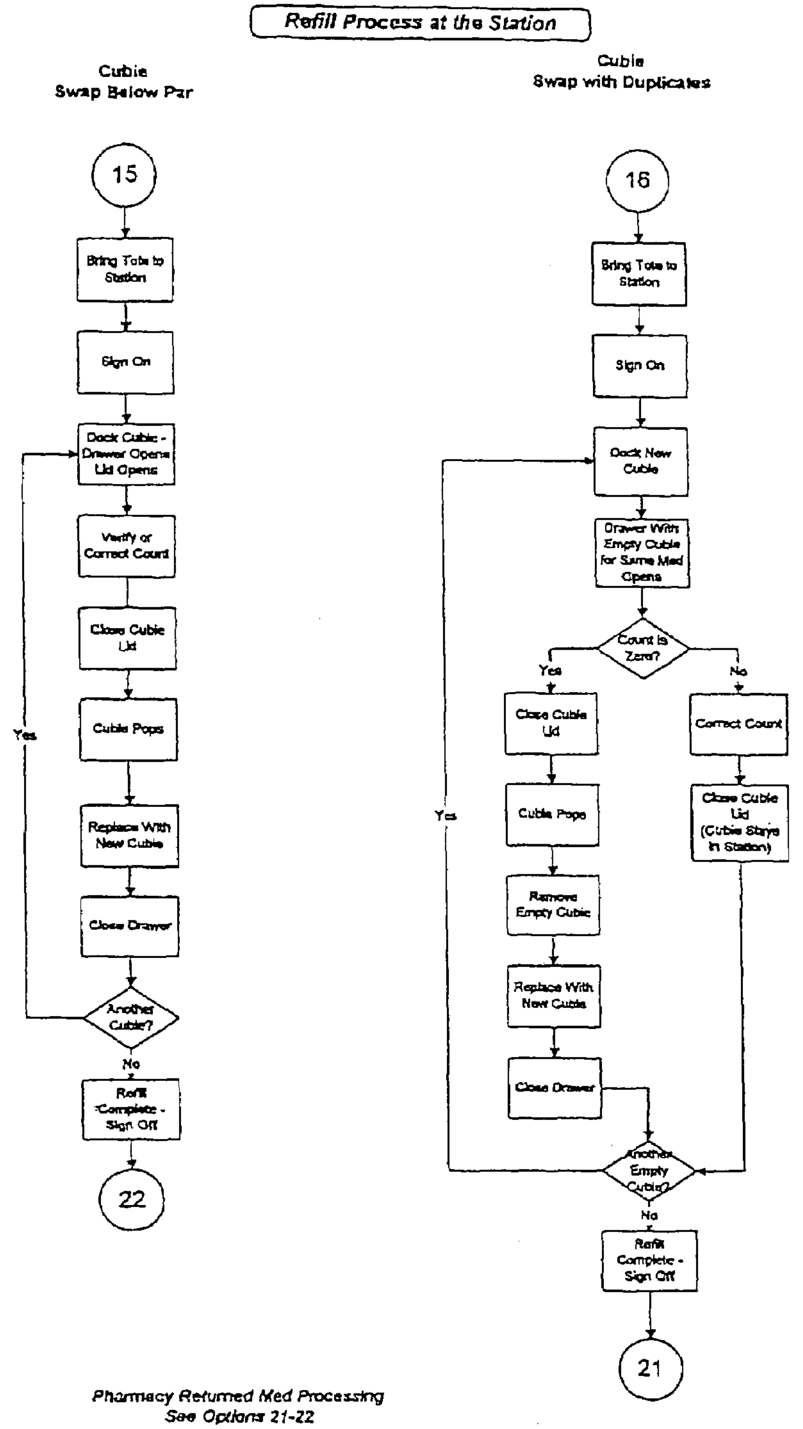
FIG. 27E shows another continuation of FIG. 27B through a refill process that may have applicability to the present invention.
Figure 27F:
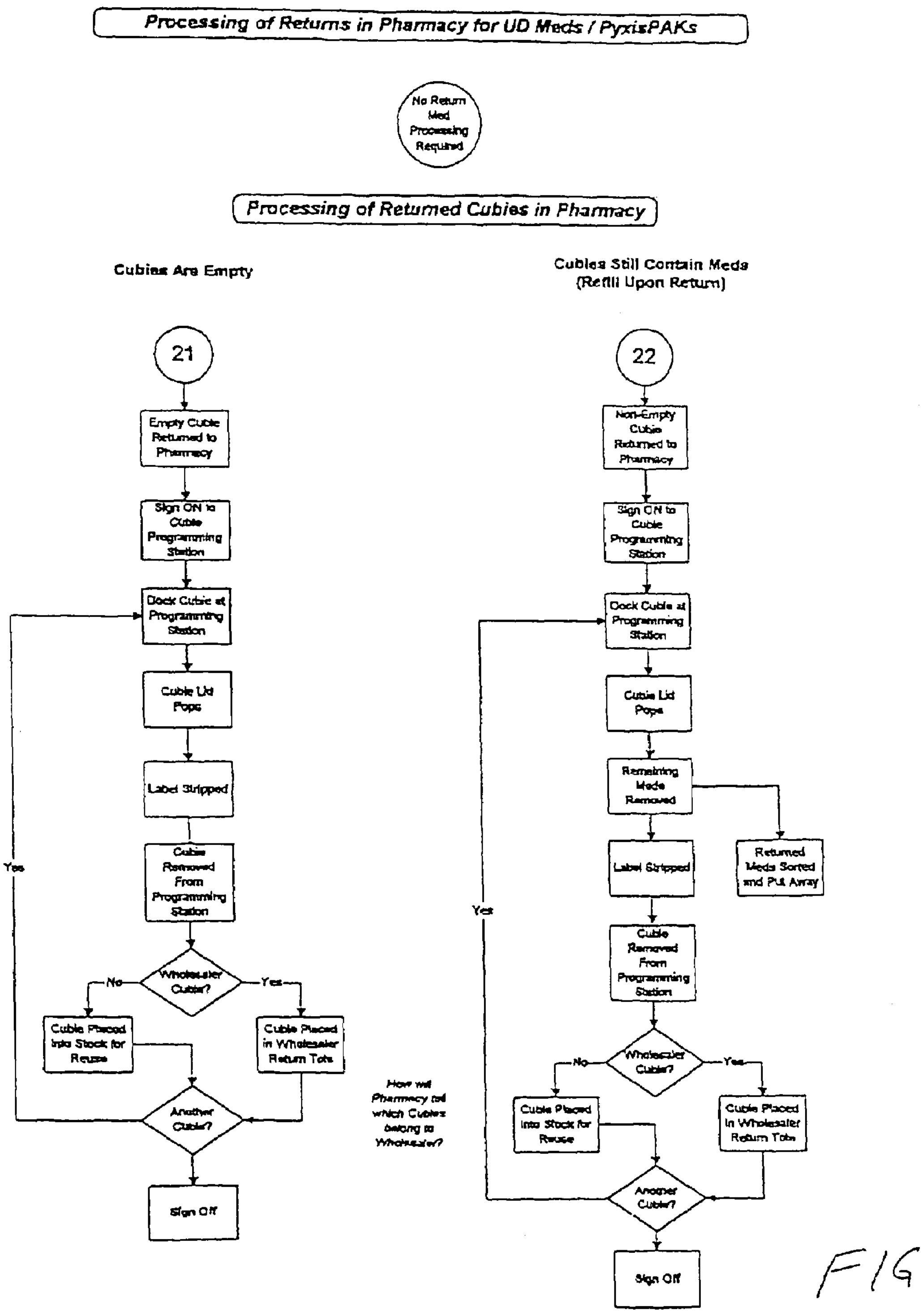
FIG. 27F shows a continuation of FIGS. 27D and 27E through a return process that may have applicability to the present invention.

FIGS. 24-26 show three (3) respective system diagrams for system implementations of the present invention beginning with a wholesaler all the way to a patient's bedside. As shown in FIG. 24, the wholesaler receives the medications and fills the receptacles of the present invention with doses of the medications. These receptacles are then transferred to a pharmacy, such as a hospital pharmacy, where they are next loaded into an automated dispensing machine. From the automated dispensing machine, the medications may be removed by appropriate personnel from the receptacles and administered to a patient at the patient's beside. The lower portion of the diagram of FIG. 24 shows a flow of information from the automated dispensing machine to the various computer systems in communication with the computer of the automated dispensing machine. For example, as FIG. 24 demonstrates, information concerning drugs administered to patients may be communicated to a hospital pharmacy computer, the wholesaler's computer, and the packaging company computer. FIG. 25 shows a similar diagram, however, in this implementation, the receptacles are not filled prior to the drugs arriving at the automated dispensing machine. Instead, the receptacles are refilled at the automated dispensing machine and arrive at the automated dispensing machine in unit dose packs. FIG. 26 shows another embodiment of a system of the present invention in which unit dose packs and prefilled receptacles are delivered to the automated dispensing machine where some previously existing receptacles at the automated dispensing machine are swapped for new receptacles.

Many advantages are derived from the receptacle of the present invention. Another advantage is seen from FIGS. 24-26. Due to the self-contained nature of each receptacle, much of the processing and handling of receptacles may be done automatically. For example, in FIG. 24, an automated storage and transfer mechanism 200 may receive medications in packages and move the packages to a station where the receptacles are filled with the packages by robotics means.

FIGS. 27A through 27F show flow diagrams of preferred embodiments of the present invention whereby the receptacles, referred to as Cubies™ by the present inventors, are shown to be prepared at a pharmacy, through a pick process, a refill process, and a return process. Several possible modifications to these flow processes are able to be made without departing from the present invention. These flow diagrams are offered as an example.

Numerous modifications and variations in the invention are expected to occur to those skilled in the art upon considerations of the foregoing descriptions. The invention should not be construed as limited to the preferred embodiments and modes of preparation described herein, since these are to be regarded as illustrative rather than restrictive.

The invention claimed is:

1. An apparatus for distributing drugs, the apparatus comprising:

an automated dispensing machine having at least one drawer;

a plurality of receptacles adapted to be placed in said at least one drawer, said receptacles each having a plurality of side walls, a bottom adjoined to said side walls, and a top movably secured to at least one of said side walls such that said top is adapted for movement between an open position and a closed position, said receptacles being individually removable from said at least one drawer;

an information storage device secured to or in each of said receptacles for storing information relative to contents of each of said receptacles;

a communication contact on each of said receptacles enabling the wireless transfer of information between said information storage device and an information source, wherein said automated dispensing machine is adapted to receive information and to process a signal to one of said receptacles to cause said one of said receptacles to open and enable removal of at least a portion of the contents of said one of said receptacles.

2. The apparatus of claim 1, further comprising a barcode scanner or an RF station for communicating with the communication contact.

3. The apparatus of claim 1, wherein the communication contact comprises a bar code label or an RF chip.

4. The apparatus of claim 1, wherein the apparatus further comprises a computer and a keyboard and wherein at least one of the receptacles has a wired communication contact for communication with the computer for storing and updating information concerning the contents of the receptacle.

5. The apparatus of claim 1, wherein the apparatus is remote from and in communication with a computer at a healthcare facility.

6. An apparatus, comprising:

a receptacle adapted for removable placement in a dispensing machine, said receptacle having a lid that is adapted for movement between an open position and a closed position; said receptacle being individually removable from said dispensing machine; and an information storage device secured to or in said receptacle for storing information relative to contents of said receptacle and for wirelessly porting said information to said dispensing machine and for exchanging and updating said information stored in said information storage device with a computer operating said dispensing machine.

7. The apparatus of claim 6, further comprising a communication contact on said receptacle enabling the transfer of information between said information storage device and the computer.

8. The apparatus of claim 7, wherein the communication contact comprises a barcode label or an RF chip.

9. A method for distributing a plurality of items, comprising:

providing individual receptacles for said items, each of said receptacles including a plurality of side walls, a bottom adjoined to said side walls, and a top movably secured to at least one of said side walls, such that said top is adapted for movement between an open position and a closed position, said receptacles being individually removable from a dispensing machine, and an information storage device secured to or in each of said receptacles for storing information relative to said items to be contained in said receptacles;

loading said items in individual ones of said receptacles and closing said top of said receptacles; and inputting information relative to said items loaded into each of said receptacles into said information storage devices, wherein the information is transmitted wirelessly at least in part.

10. The method of claim 9, further comprising the step of providing a computer and an automated dispensing machine for dispensing said items.

11. The method of claim 10, further comprising the step of automatically entering information regarding said items in said receptacles into a memory of said automated dispensing machine.

12. The method of claim 11, further comprising the steps of:

transporting said loaded receptacles to a receiving station at a location for distribution of said items; and placing said loaded receptacles into said automated dispensing machine.

13. The method of claim 9 wherein one or more of said individual receptacles includes a communication contact on each of said receptacles enabling the wireless transfer of information between said information storage device and a computer associated with the dispensing machine.

14. The method of claim 9, wherein said items are medical products for use or intake by patients in a health care facility.

15. The method of claim 9, further comprising automatically updating inventory information in said memory of said dispensing machine when contents of said receptacle are added or removed by transmitting information wirelessly at least in part.

16. The method of claim 10, further comprising automatically communicating and updating said inventory information from said dispensing machine to a central computer remote from said dispensing machine.

17. The method of claim 9, further comprising:

loading at least one replacement receptacle with at least one replenishment item;

transmitting information at least in part by a wireless process concerning the at least one item loaded into the at least one replacement receptacle into an information storage device of the replacement receptacle;

transporting said at least one replacement receptacle to said automated dispensing machine; and removing at least one of said receptacles from said automated dispensing machine and replacing said removed receptacle with said at least one replacement receptacle.

18. The method of claim 17 wherein said entering of information regarding contents of said receptacles into said automated dispensing machine is accomplished by placing said receptacles into said automated dispensing machine and porting data contained in said information storage device through said communication contact into the automated dispensing machine.

19. The method of claim 17, further comprising scanning bar code labels on packages of said items prior to said items being placed in individual ones of said receptacles.

20. The method of claim 9, further comprising communicating information concerning said items through RF tags in said receptacles and an RF scanner on said dispensing machine.

* * * * *